United States Patent
Bessiere et al.

(10) Patent No.: US 10,839,002 B2
(45) Date of Patent: Nov. 17, 2020

(54) DEFINING A COLLECTION OF MEDIA CONTENT ITEMS FOR A RELEVANT INTEREST

(71) Applicant: Apple Inc., Cupertino, CA (US)

(72) Inventors: Kevin Bessiere, Cupertino, CA (US); Eric Circlaeys, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 378 days.

(21) Appl. No.: 15/844,409

(22) Filed: Dec. 15, 2017

(65) Prior Publication Data

US 2018/0349371 A1    Dec. 6, 2018

Related U.S. Application Data

(60) Provisional application No. 62/514,910, filed on Jun. 4, 2017.

(51) Int. Cl.
| | | |
|---|---|---|
| *G06F 7/02* | (2006.01) | |
| *G06F 16/00* | (2019.01) | |
| *G06F 16/435* | (2019.01) | |
| *G06F 16/44* | (2019.01) | |
| *G06F 16/487* | (2019.01) | |
| *G06F 16/48* | (2019.01) | |

(52) U.S. Cl.
CPC ............ *G06F 16/435* (2019.01); *G06F 16/44* (2019.01); *G06F 16/487* (2019.01); *G06F 16/489* (2019.01)

(58) Field of Classification Search
CPC .... G06F 16/435; G06F 16/489; G06F 16/487; G06F 16/44; G06F 16/00
See application file for complete search history.

(56) References Cited

U.S. PATENT DOCUMENTS

| | | | |
|---|---|---|---|
| 8,923,551 B1 | 12/2014 | Grosz et al. | |
| 9,443,146 B2 | 9/2016 | Deng et al. | |
| 9,639,740 B2 | 5/2017 | Ganong et al. | |
| 2012/0005209 A1* | 1/2012 | Rinearson | G06Q 30/02 707/737 |
| 2012/0066573 A1 | 3/2012 | Berger et al. | |
| 2014/0337346 A1* | 11/2014 | Barthel | G06F 16/7867 707/738 |
| 2017/0091154 A1 | 3/2017 | Eppolito et al. | |
| 2017/0249306 A1* | 8/2017 | Allen | G06F 16/435 |
| 2017/0357644 A1 | 12/2017 | Circlaeys et al. | |
| 2017/0357672 A1 | 12/2017 | Circlaeys et al. | |
| 2017/0359236 A1 | 12/2017 | Circlaeys et al. | |

FOREIGN PATENT DOCUMENTS

WO    2015/200120    12/2015

* cited by examiner

*Primary Examiner* — Bruce M Moser
(74) *Attorney, Agent, or Firm* — Van Court & Aldridge LLP

(57) ABSTRACT

Systems, methods, and computer-readable media for defining a collection of media content items of a media library for a relevant interest are provided.

20 Claims, 9 Drawing Sheets

ACCESS A PLURALITY OF MEDIA CONTENT ITEMS (MCIs) OF A MEDIA LIBRARY AND METADATA ASSOCIATED WITH THE MEDIA LIBRARY, WHEREIN THE METADATA DEFINES A PLURALITY OF MOMENTS, EACH MOMENT OF THE PLURALITY OF MOMENTS IS ASSOCIATED WITH A SUBSET OF MCIS OF THE PLURALITY OF MCIs, AND EACH MCI OF THE SUBSET OF MCIs THAT IS ASSOCIATED WITH A PARTICULAR MOMENT IS ASSOCIATED WITH GEOGRAPHICAL METADATA INDICATIVE OF A GEOGRAPHIC LOCATION WITHIN A PARTICULAR GEOGRAPHIC RANGE ASSOCIATED WITH THE PARTICULAR MOMENT AND TEMPORAL METADATA INDICATIVE OF A TIME WITHIN A PARTICULAR TIME RANGE ASSOCIATED WITH THE PARTICULAR MOMENT
702

ANALYZE THE PLURALITY OF MCIs AND THE METADATA BY IDENTIFYING A PLURALITY OF FIRST PERSON RESIDENCE MOMENTS FROM THE PLURALITY OF MOMENTS, WHEREIN EACH FIRST PERSON RESIDENCE MOMENT OF THE PLURALITY OF FIRST PERSON RESIDENCE MOMENTS IS A MOMENT OF THE PLURALITY OF MOMENTS THAT IS ASSOCIATED WITH BOTH A FIRST PERSON AND A RESIDENCE OF THE FIRST PERSON AND BY IDENTIFYING AN INTEREST THAT IS ASSOCIATED WITH EACH ONE OF A FIRST NUMBER OF FIRST PERSON RESIDENCE MOMENTS OF THE PLURALITY OF FIRST PERSON RESIDENCE MOMENTS, WHEREIN THE FIRST NUMBER IS GREATER THAN A THRESHOLD VALUE
704

DEFINE A COLLECTION OF MCIs OF THE PLURALITY OF MCIs, WHEREIN EACH MCI OF THE COLLECTION OF MCIs IS ASSOCIATED WITH A MOMENT OF THE PLURALITY OF MOMENTS THAT IS ASSOCIATED WITH BOTH THE FIRST PERSON AND THE INTEREST
706

```
┌─────────────────────────────────────────────────────────────────────┐
│ ACCESS A PLURALITY OF MEDIA CONTENT ITEMS (MCIs) OF A MEDIA LIBRARY │
│ AND METADATA ASSOCIATED WITH THE MEDIA LIBRARY, WHEREIN THE         │
│ METADATA DEFINES A PLURALITY OF MOMENTS, EACH MOMENT OF THE         │
│ PLURALITY OF MOMENTS IS ASSOCIATED WITH A SUBSET OF MCIs OF THE     │
│ PLURALITY OF MCIs, AND EACH MCI OF THE SUBSET OF MCIs THAT IS       │
│ ASSOCIATED WITH A PARTICULAR MOMENT IS ASSOCIATED WITH TEMPORAL     │
│ METADATA INDICATIVE OF A TIME WITHIN A PARTICULAR TIME RANGE        │
│ ASSOCIATED WITH THE PARTICULAR MOMENT                                │
│                                 802                                  │
└─────────────────────────────────────────────────────────────────────┘
                                  ↓
┌─────────────────────────────────────────────────────────────────────┐
│ ANALYZE THE PLURALITY OF MCIs AND THE METADATA BY IDENTIFYING AT    │
│ LEAST ONE PERSON RESIDENCE MOMENT FROM THE PLURALITY OF MOMENTS,    │
│ WHEREIN EACH PERSON RESIDENCE MOMENT OF THE AT LEAST ONE PERSON     │
│ RESIDENCE MOMENT IS A MOMENT OF THE PLURALITY OF MOMENTS THAT IS    │
│ ASSOCIATED WITH A LOCATION INTIMATELY ASSOCIATED WITH A PERSON      │
│ IDENTITY AND BY IDENTIFYING AN INTEREST THAT IS ASSOCIATED WITH AT  │
│ LEAST ONE OF THE AT LEAST ONE PERSON RESIDENCE MOMENT               │
│                                 804                                  │
└─────────────────────────────────────────────────────────────────────┘
                                  ↓
┌─────────────────────────────────────────────────────────────────────┐
│ DEFINE A COLLECTION OF MCIs OF THE PLURALITY OF MCIs, WHEREIN EACH  │
│ MCI OF THE COLLECTION OF MCIs IS ASSOCIATED WITH THE IDENTIFIED     │
│ INTEREST                                                             │
│                                 806                                  │
└─────────────────────────────────────────────────────────────────────┘
```

```
┌─────────────────────────────────────────────────────────────────────────┐
│ ACCESS A PLURALITY OF MEDIA CONTENT ITEMS (MCIs) OF A MEDIA LIBRARY AND │
│                METADATA ASSOCIATED WITH THE MEDIA LIBRARY               │
│                                   902                                   │
└─────────────────────────────────────────────────────────────────────────┘
                                     │
                                     ▼
┌─────────────────────────────────────────────────────────────────────────┐
│ IDENTIFY AT LEAST A THRESHOLD NUMBER OF MCIs OF THE PLURALITY OF MCIs   │
│ THAT ARE ASSOCIATED WITH BOTH A PARTICULAR PERSON ENTITY AND A          │
│                       PARTICULAR INTEREST                               │
│                                904                                      │
└─────────────────────────────────────────────────────────────────────────┘
                                     │
                                     ▼
┌─────────────────────────────────────────────────────────────────────────┐
│ DEFINE A COLLECTION OF MCIs OF THE PLURALITY OF MCIs, WHEREIN EACH MCI  │
│ OF THE COLLECTION OF MCIs IS ASSOCIATED WITH THE PARTICULAR INTEREST    │
│                                906                                      │
└─────────────────────────────────────────────────────────────────────────┘

DEFINING A COLLECTION OF MEDIA CONTENT ITEMS FOR A RELEVANT INTEREST

CROSS-REFERENCE TO RELATED APPLICATION(S)

This application claims the benefit of prior filed U.S. Provisional Patent Application No. 62/514,910, filed Jun. 4, 2017, which is hereby incorporated by reference herein in its entirety.

TECHNICAL FIELD

This disclosure relates to defining a collection of media content items for a relevant interest with an electronic device.

BACKGROUND OF THE DISCLOSURE

A system may be provided for managing a library of media items. Often, however, management of such a library may fail to identify certain media items as being indicative of a relevant interest of a user.

SUMMARY OF THE DISCLOSURE

This document describes systems, methods, and computer-readable media for defining a collection of media content items of a media library for a relevant interest with an electronic device.

For example, a non-transitory machine readable medium storing a program for execution by at least one processing unit of a device may be provided, the program for managing a media library, the program including sets of instructions for accessing a plurality of media content items (MCIs) of the media library and metadata associated with the media library, wherein the metadata defines a plurality of moments, each moment of the plurality of moments is associated with a subset of MCIs of the plurality of MCIs, and each MCI of the subset of MCIs that is associated with a particular moment is associated with geographical metadata indicative of a geographic location within a particular geographic range associated with the particular moment and temporal metadata indicative of a time within a particular time range associated with the particular moment, analyzing the plurality of MCIs and the metadata, wherein the analyzing includes identifying a plurality of first person-residence moments from the plurality of moments, wherein each first person-residence moment of the plurality of first person-residence moments is a moment of the plurality of moments that is associated with both a first person and a residence of the first person, and identifying an interest that is associated with each one of a first number of first person-residence moments of the plurality of first person-residence moments, wherein the first number is greater than a threshold value, and defining a collection of MCIs of the plurality of MCIs, wherein each MCI of the collection of MCIs is associated with a moment of the plurality of moments that is associated with both the first person and the interest.

As another example, a method of managing a media library with a computing system may include accessing, with the computing system, a plurality of media content items (MCIs) of the media library and metadata associated with the media library, wherein the metadata defines a plurality of moments, each moment of the plurality of moments is associated with a subset of MCIs of the plurality of MCIs, and each MCI of the subset of MCIs that is associated with a particular moment is associated with temporal metadata indicative of a time within a particular time range associated with the particular moment, analyzing, with the computing system, the plurality of MCIs and the metadata, wherein the analyzing includes identifying at least one person-residence moment from the plurality of moments, wherein each person-residence moment of the at least one person-residence moment is a moment of the plurality of moments that is associated with a location intimately associated with a person identity, and identifying an interest that is associated with at least one of the at least one person-residence moment, and defining, with the computing system, a collection of MCIs of the plurality of MCIs, wherein each MCI of the collection of MCIs is associated with the identified interest.

As yet another example, a method of managing a media library with a computing system may include accessing, with the computing system, a plurality of media content items (MCIs) of the media library, identifying, with the computing system, at least a threshold number of MCIs of the plurality of MCIs that are associated with both a particular person entity and a particular interest, and defining, with the computing system, a collection of MCIs of the plurality of MCIs, wherein each MCI of the collection of MCIs is associated with the particular interest.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 6-9 are flowcharts of illustrative processes for managing a media library.

DETAILED DESCRIPTION OF THE DISCLOSURE

Systems, methods, and computer-readable media may be provided to define a collection of media content items of a media library for a relevant interest. For example, a combination of a particular interest and a particular person identity may be identified based on analysis of a media library of media content items ("MCIs") in order to determine whether the particular interest is relevant to the person identity. For example, a location may be determined to be intimately associated with the person identity (e.g., a home or place of business of the person identity), and then it may be determined whether the particular interest may be associated with a particular threshold amount of MCIs (or moments of MCIs) also associated with any such intimate location. Some or all MCIs determined to be associated with a relevant interest of a person identity may be used to define an MCI collection for any suitable purpose (e.g., for defining an easily accessible album of such MCIs or for generating a composite presentation of the MCIs for user enjoyment).

Figure 1:
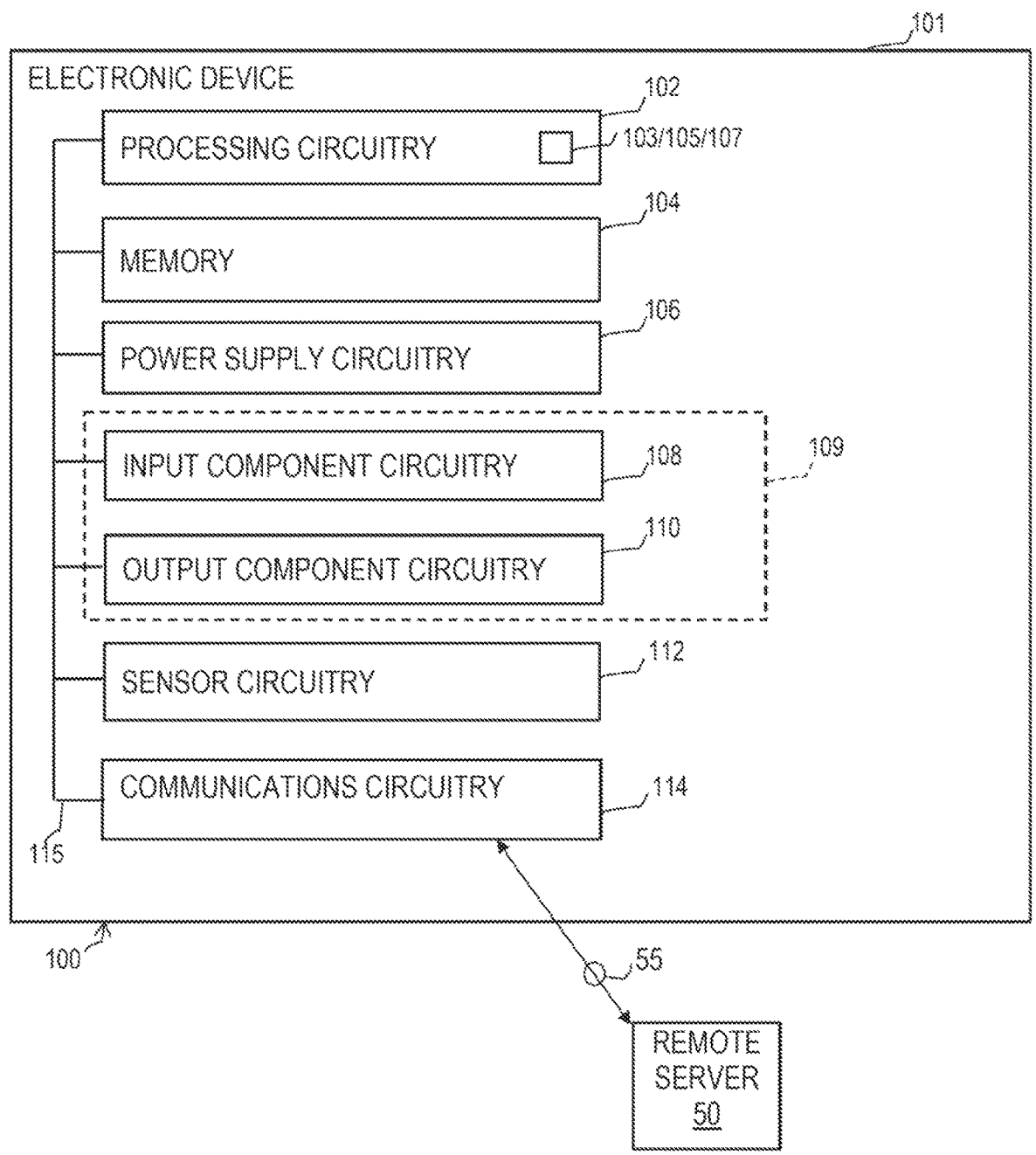
FIG. 1 is a schematic view of an illustrative system for defining a collection of media content items of a media library for a relevant interest.

FIG. 1 is a schematic view of an illustrative system 1 that may include at least one of electronic device 100 and remote server 50 for defining a collection of media content items for a relevant interest in accordance with some embodiments. Electronic device 100 can include, but is not limited to, a media player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, watch, biometric monitor, or any combination thereof. In some embodiments, electronic device 100 may perform a single function (e.g., a device dedicated to defining a collection of media content items for a relevant interest) and, in other embodiments, electronic device 100 may perform multiple functions (e.g., a device that manages a media library, plays music, and receives and transmits telephone calls). Electronic device 100 may be any portable, mobile, hand-held, or miniature electronic device that may be configured to define a collection of media content items for a relevant interest wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include processing circuitry 102, memory 104, power supply circuitry 106, input component circuitry 108, output component circuitry 110, sensor circuitry 112, and communications circuitry 114. Electronic device 100 may also include a bus 115 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including, for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, media information (e.g., media content and/or associated metadata), preference information (e.g., media playback preferences), lifestyle information (e.g., food preferences), exercise information (e.g., information obtained by exercise monitoring equipment or any suitable sensor circuitry), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any other suitable data, or any combination thereof.

Power supply circuitry 106 can include any suitable circuitry for receiving and/or generating power, and for providing such power to one or more of the other components of electronic device 100. For example, power supply circuitry 106 can be coupled to a power grid (e.g., when device 100 is not acting as a portable device or when a battery of the device is being charged at an electrical outlet with power generated by an electrical power plant). As another example, power supply circuitry 106 can be configured to generate power from a natural source (e.g., solar power using solar cells). As another example, power supply circuitry 106 can include one or more batteries for providing power (e.g., when device 100 is acting as a portable device). For example, power supply circuitry 106 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply circuitry 106 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply circuitry 106 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 108 may be provided to permit a user to interact or interface with device 100. For example, input component circuitry 108 can take a variety of forms, including, but not limited to, a touch pad, dial, click wheel, scroll wheel, touch screen, one or more buttons (e.g., a keyboard), mouse, joy stick, track ball, microphone, still image camera, video camera, scanner (e.g., a bar code scanner or any other suitable scanner that may obtain product identifying information from a code, such as a bar code, or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 108 can be configured to provide one or more dedicated control functions for making selections or issuing commands associated with operating device 100.

Electronic device 100 may also include one or more output components 110 that may present information (e.g., graphical, audible, and/or tactile information) to a user of device 100. For example, output component circuitry 110 of electronic device 100 may take various forms, including, but not limited to, audio speakers, headphones, line-out connectors for data and/or power, visual displays, infrared ports, tactile/haptic outputs (e.g., rumblers, vibrators, etc.), and combinations thereof. As a particular example, electronic device 100 may include a display output component as output component 110, where such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O circuitry or I/O interface (e.g., input component 108 and output component 110 as I/O component or I/O interface 109). For example, input component 108 and output component 110 may sometimes be a single I/O component 109, such as a touch screen, that may receive input information through a user's touch (e.g., multi-touch) of a display screen and that may also provide visual information to a user via that same display screen.

Sensor circuitry 112 may include any suitable sensor or any suitable combination of sensors operative to detect movements of electronic device 100 and/or any other characteristics of device 100 or its environment (e.g., physical activity or other characteristics of a user of device 100). For example, sensor circuitry 112 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor circuitry 112 may include one or more single-axis or two-axis acceleration motion sensors that may be operative to detect linear acceleration only along each of the x- or left/right direction and the y- or up/down direction, or along any other pair of directions. In some embodiments, sensor circuitry 112 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). In some embodiments, sensor circuitry 112 may be operative to directly or indirectly detect rotation, rotational movement, angular displacement, tilt, position, orientation, motion along a non-linear (e.g., arcuate) path, or any other non-linear motions. Additionally or alternatively, sensor circuitry 112 may include one or more angular rate, inertial, and/or gyro-motion sensors or gyroscopes for detecting rotational movement. For example, sensor circuitry 112 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor circuitry 112 for detecting motion on device 100, such as any suitable pressure sensors, altimeters, or the like. Using sensor circuitry 112, electronic device 100 may be configured to determine a velocity, acceleration, orientation, and/or any other suitable motion attribute of electronic device 100.

Sensor circuitry 112 may include any suitable sensor(s), including, but not limited to, one or more of a GPS sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. In some examples, a biometric sensor may include, but is not limited to, one or more health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Using one or more of these sensors, device 100 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) of device 100 can be used to determine a user's location and movement, as well as a displacement of the user's motion. An accelerometer, directional sensor, and/or gyroscope can further generate activity data that can be used to determine whether a user of device 100 is engaging in an activity, is inactive, or is performing a gesture. Device 100 can further include a timer that can be used, for example, to add time dimensions to various attributes of the detected physical activity, such as a duration of a user's physical activity or inactivity, time(s) of a day when the activity is detected or not detected, and/or the like. One or more sensors of sensor circuitry or component 112 may be embedded in a body (e.g., housing 101) of device 100, such as a long a bottom surface that may be operative to contact a user, or can be positioned at any other desirable location. In some examples, different sensors can be placed in different locations inside or on the surfaces of device 100 (e.g., some located inside housing 101) and some attached to an attachment mechanism (e.g., a wrist band coupled to a housing of a wearable device), or the like. In other examples, one or more sensors can be worn by a user separately from device 100. In such cases, the sensors can be configured to communicate with device 100 using a wired and/or wireless technology (e.g., via communications circuitry 114). In some examples, sensors can be configured to communicate with each other and/or share data collected from one or more sensors. In some other examples, device 100 can be waterproof such that the sensors can detect a user's activity in water.

Communications circuitry 114 may be provided to allow device 100 to communicate with one or more other electronic devices or servers using any suitable communications protocol. For example, communications circuitry 114 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoW-PAN") module, Near Field Communication ("NFC"), any other communications protocol, or any combination thereof. Communications circuitry 114 may also include or be electrically coupled to any suitable transceiver circuitry that can enable device 100 to be communicatively coupled to another device (e.g., a host computer or an accessory device) and communicate with that other device wirelessly, or via a wired connection (e.g., using a connector port). Communications circuitry 114 may be configured to determine a geographical position of electronic device 100. For example, communications circuitry 114 may utilize the global positioning system ("GPS") or a regional or site-wide positioning system that may use cell tower positioning technology or Wi-Fi™ technology.

Processing circuitry 102 of electronic device 100 may include any processing circuitry that may be operative to control the operations and performance of one or more components of electronic device 100. For example, processor 102 may receive input signals from any input component 108 and/or sensor circuitry 112 and/or communications circuitry 114 and/or drive output signals through any output component 110 and/or communications circuitry 114. As shown in FIG. 1, processor 102 may be used to run at least one application 103. Application 103 may include, but is not limited to, one or more operating system applications, firmware applications, software applications, algorithmic modules, media analysis applications, media playback applications, media editing applications, communications applications, pass applications, calendar applications, social media applications, state determination applications, biometric feature-processing applications, activity monitoring applications, activity motivating applications, and/or any other suitable applications. For example, processor 102 may load application 103 as a user interface program to determine how instructions or data received via an input component 108 and/or any other component of device 100 may manipulate the one or more ways in which information may be stored and/or provided to the user via an output component 110 and/or any other component of device 100. Any application 103 may be accessed by any processing circuitry 102 from any suitable source, such as from memory 104 (e.g., via bus 115) and/or from another device or server (e.g., remote server 50) (e.g., via communications circuitry 114). Processor 102 may include a single processor or multiple processors. For example, processor 102 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Processor 102 also may include on board memory for caching purposes.

Processor 102 may be configured to capture (e.g., with an input component 108) or otherwise access (e.g., from memory 104 and/or communications circuitry 114) and process any suitable library 105 of any suitable amount of media content pieces (e.g., any media content and/or associated metadata) for managing the media content pieces in an effective and user-friendly manner. Media content pieces ("MCPs") may include any suitable type of asset or item of media content, such as image content (e.g., pixel values for one or more photographs or video frames) and/or audio content (e.g., one or more audio tracks that may or may not be associated with video frames as audio/visual video content) and/or text content (e.g., an E-book, etc.) and/or haptic content (e.g., vibrations or motions that may be provided in connection with other media, such as a video), where examples of different types of visual media content of an MCP may include, but are not limited to, a still photo, a video clip, a burst-mode photo sequence, a panoramic photo, a time lapse video, a slow motion video, a short video that may be captured alongside a photograph (e.g., a Live Photo™ available by Apple Inc.), and/or the like. An MCP may also include any suitable amount of any suitable type(s) of metadata assets or metadata content (metadata) that may describe one or more characteristics of and be associated with the media content (e.g., an image, a video, etc.) of the MCP, including, but not limited to, captured metadata, post-capture metadata, derived metadata, explicit user-assigned metadata, and/or the like. Additionally, processor 102 may be configured to generate or otherwise access (e.g., from memory 104 and/or communications circuitry 114) an MCP management system 107 (e.g., a database (e.g., a relational database (e.g., a tabular database, etc.), a distributed database that can be dispersed or replicated among different points in a network, an object-oriented programming database that can be congruent with the data defined in object classes and subclasses, etc.) and/or a knowledge graph metadata network) that may be operative to be used by processor 102 (e.g., along with or as a portion of any suitable application 103) to manage, store, ingest, organize, and/or retrieve the various MCPs of library 105. In some examples where device 100 may collect and/or process a relatively large MCP library 105 and/or use relatively large MCP management systems 107, device 100 may not have enough memory capacity to collect and process and store all of the data for such a library and/or management system and can instead be configured to offload some or all of the data on an external device that may be remote from device 100 (e.g., server 50, which, although not shown, may be configured to include, one, some, each, and/or multiple ones of the components of device 100). The external device can be configured to communicate with a plurality of devices 100, and store data collected from these devices. The external device can be further configured to execute computer instructions on the data and communicate the result with one or more of these devices 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 108 may be an independent keyboard or mouse within its own housing that may wirelessly or through a wire communicate with processor 102, which may be provided within its own housing).

Figure 2:
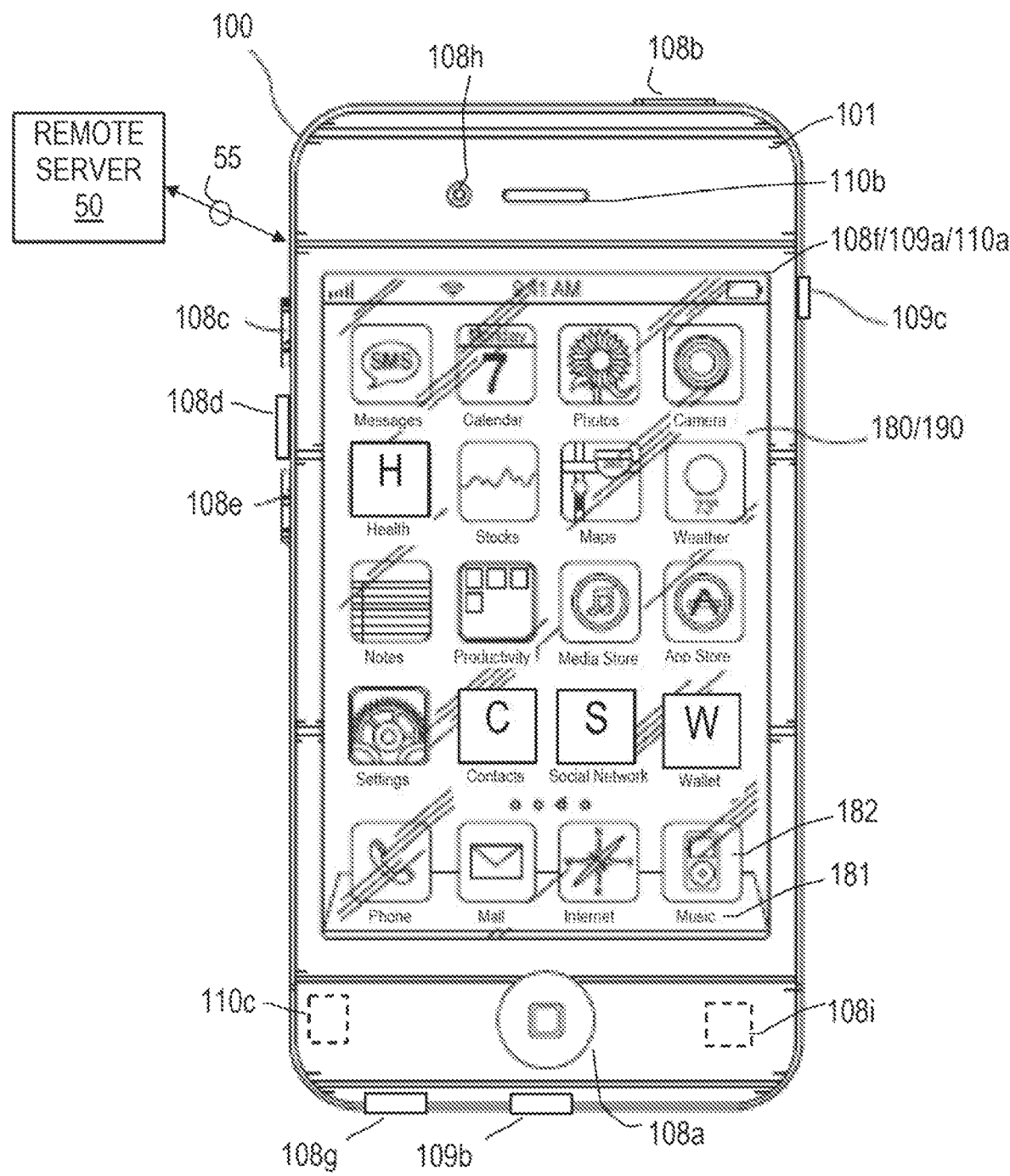
FIG. 2 is a front view of an illustrative example of an electronic device in the system of FIG. 1.

As shown in FIG. 2, one specific example of electronic device 100 may be an electronic device, such as an iPhone™, where housing 101 may allow access to various input components 108a-108i, various output components 110a-110c, and various I/O components 109a-109c through which device 100 and a user and/or an ambient environment may interface with each other. Input component 108a may include a button that, when pressed, may cause a "home" screen or menu of a currently running application to be displayed by device 100. Input component 108b may be a button for toggling electronic device 100 between a sleep mode and a wake mode or between any other suitable modes. Input component 108c may include a two-position slider that may disable one or more output components 112 in certain modes of electronic device 100. Input components 108d and 108e may include buttons for increasing and decreasing the volume output or any other characteristic output of an output component 110 of electronic device 100. Each one of input components 108a-108e may be a mechanical input component, such as a button supported by a dome switch, a sliding switch, a control pad, a key, a knob, a scroll wheel, or any other suitable form.

An output component 110a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103) that may be displayed in all or some of the areas of display output component 110a. One or more of user input components 108a-108i may be used to navigate through GUI 180. For example, one user input component 108 may include a scroll wheel that may allow a user to select one or more graphical elements or icons 182 of GUI 180. Icons 182 may also be selected via a touch screen I/O component 109a that may include display output component 110a and an associated touch input component 108f. Such a touch screen I/O component 109a may employ any suitable type of touch screen input technology, such as, but not limited to, resistive, capacitive, infrared, surface acoustic wave, electromagnetic, or near field imaging. Furthermore, touch screen I/O component 109a may employ single point or multi-point (e.g., multi-touch) input sensing.

Icons 182 may represent various applications, layers, windows, screens, templates, elements, and/or other components that may be displayed in some or all of the areas of display component 110a upon selection by the user. Furthermore, selection of a specific icon 182 may lead to a hierarchical navigation process. For example, selection of a specific icon 182 may lead from screen 190 of FIG. 2 to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon labeled with a "Photos" textual indicator is selected, device 100 may launch or otherwise access a media management and editing application (e.g., Photos™ available by Apple Inc.) that may provide user access to one or more collections of MCPs (e.g., photos and/or videos) and may display screens of a specific user interface that may include one or more tools or features for interacting with media content. As another example, when the specific icon labeled with a "Calendar" textual indicator is selected, device 100 may launch or otherwise access a specific calendar or reminder application and may display screens of a specific user interface that may include one or more tools or features for interacting with one or more events or other reminders that may be time-sensitive in a specific manner. As another example, when the specific icon labeled with a "Wallet" textual indicator is selected, device 100 may launch or otherwise access a specific pass or wallet application and may display screens of a specific user interface that may include one or more tools or features for interacting with one or more passes or other credentials (e.g., payment credentials of an NFC component) in a specific manner. As another example, when the specific icon labeled with a "Contacts" textual indicator is selected, device 100 may launch or otherwise access a specific contacts or address book application and may display screens of a specific user interface that may include one or more tools or features for interacting with one or more contacts of one or more persons or businesses or other entities in a specific manner. As another example, when the specific icon labeled with a "Social Media" textual indicator is selected, device 100 may launch or otherwise access a specific social media application or site and may display screens of a specific user interface that may include one or more tools or features for interacting with one or more social media networks with which a user may or may not have an account in a specific manner. As another example, when the specific icon labeled with a "Weather" textual indicator is selected, device 100 may launch or otherwise access a specific weather application or site and may display screens of a specific user interface that may include one or more tools or features for determining or presenting the current and/or past and/or future weather and/or other environmental conditions local to and/or distant from device 100 in a specific manner (e.g., as may be detected by any suitable sensors of device 100 and/or of remote server 50). As another example, when the specific icon labeled with a "Health" textual indicator is selected, device 100 may launch or otherwise access a specific health application or site and may display screens of a specific user interface that may include one or more tools or features for determining or presenting the current and/or past health activities and/or biometric characteristics of a user (e.g., as may be detected by any suitable sensors of device 100 and/or of remote server 50) in a specific manner. For each application, screens may be displayed on display output component 110a and may include various user interface elements. Additionally or alternatively, for each application, various other types of non-visual information may be provided to a user via various other output components 110 of device 100.

Electronic device 100 also may include various other I/O components 109 that may allow for communication between device 100 and other devices, such as a connection port 109b that may be configured for transmitting and receiving data files, such as media files or customer order files, and/or any suitable information (e.g., audio signals) from a remote data source and/or power from an external power source. For example, I/O component 109b may be any suitable port (e.g., a Lightning™ connector or a 30-pin dock connector available by Apple Inc.). I/O component 109c may be a connection slot for receiving a SIM card or any other type of removable component. Electronic device 100 may also include at least one audio input component 110g, such as a microphone, and at least one audio output component 110b, such as an audio speaker. Electronic device 100 may also include at least one tactile output component 110c (e.g., a rumbler, vibrator, haptic and/or taptic component, etc.), a camera and/or scanner input component 108h (e.g., a video or still camera, and/or a bar code scanner or any other suitable scanner that may obtain product identifying information from a code, such as a bar code, or the like), and a biometric input component 108i (e.g., a fingerprint reader or other feature recognition sensor, which may operate in conjunction with a feature-processing application that may be accessible to electronic device 100 for authenticating a user).

Figure 3:
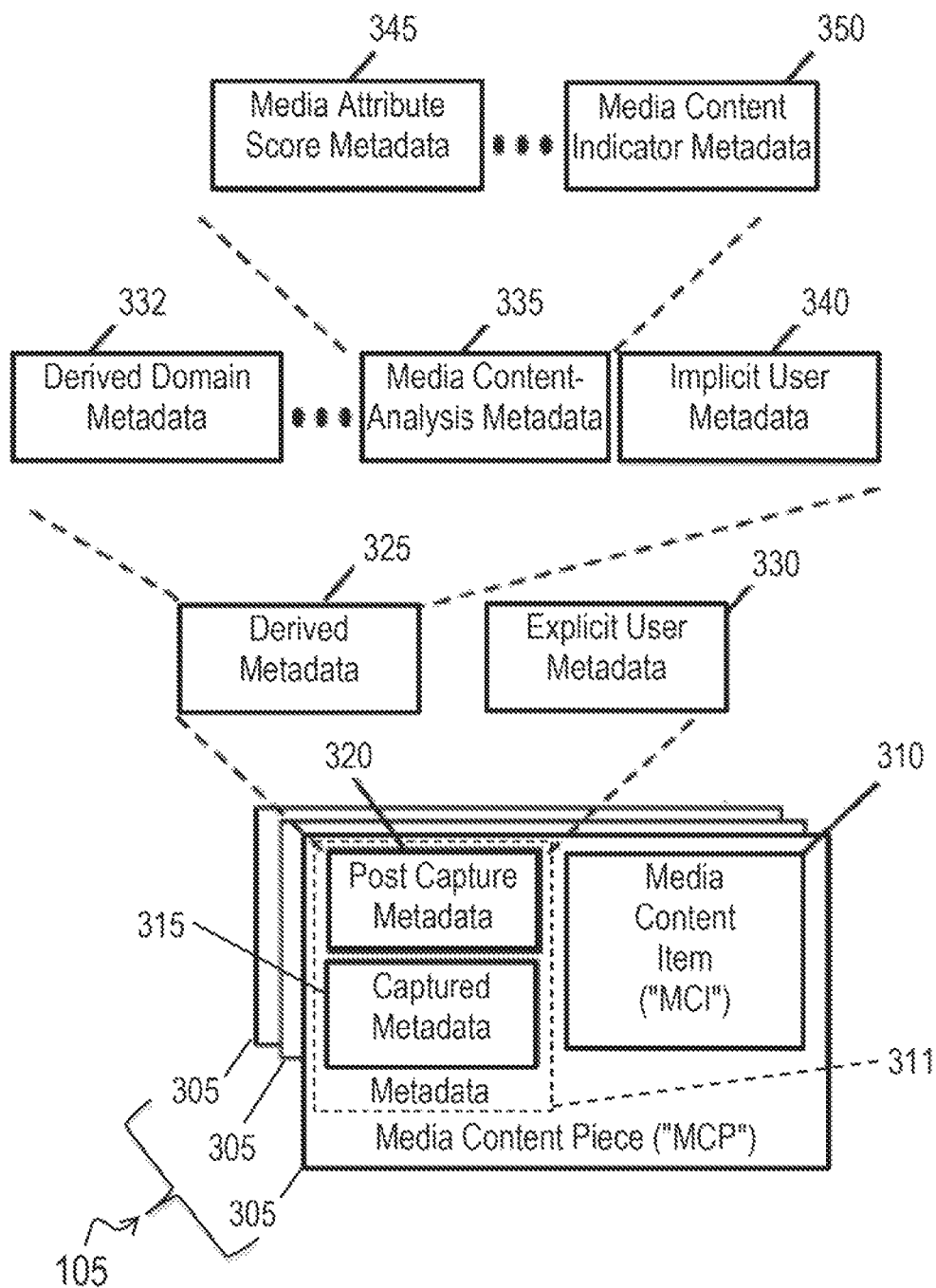
FIG. 3 is an exemplary block diagram of at least a portion of a library of media content pieces of the system of FIGS. 1 and 2.

FIG. 3 is an illustrative schematic of MCP library 105, which may include any suitable number of MCPs 305 of any suitable type. Library 105 may at least partially reside on device 100 (e.g., in memory 104) and/or may at least partially reside on a remote server (e.g., server 50) that may be accessible to device 100. As shown in FIG. 3, for example, at least one, some, or each MCP 305 may include an asset or item of MCP media content or an MCP media content item ("MCI") 310 (e.g., an image, a video, etc.) and associated MCP metadata content 311. MCP metadata content 311 may include any suitable number of metadata assets of any suitable type(s) of metadata, including, but not limited to, captured metadata 315 and post-capture metadata 320. Captured metadata 315 may include any suitable metadata that may be generated by or associated with characteristics of the capture device that captured the associated media content 310 (e.g., by camera input component 108h and/or any other suitable component(s) of device 100 or by any suitable component(s) of any other suitable media capture device (e.g., server 50)) at the time that such media content is captured. Examples of capture metadata 315 may include, but are not limited to, date and time of media content capture (e.g., based on a clock of device 100), location of media content capture (e.g., based on GPS or any other location service of device 100), one or media capture device settings of media content capture (e.g., any suitable settings of camera input component 108h, such as exposure, flash, white point, etc.), and/or the like.

Post-capture metadata 320 may include any suitable type(s) of metadata that may be defined for the media content after the media content has been capture. As shown, for example, two exemplary types of post-capture metadata 320 may include derived metadata 325 and explicit user-assigned metadata 330. Explicit user-assigned metadata 330 may include any suitable keywords (e.g., birthday, vacation, anniversary, etc.) or other suitable tags (e.g., like, dislike, favorite, verification of identity of one or more content indicators (e.g., faces or locations or scenes or clusters of features or indicators or otherwise) in the media content, etc.) that a user may assign to or otherwise associate with the media content and/or one or more user-specified associations for the MCP with respect to other MCPs (e.g., inclusion of the MCP in a user-specified album (e.g., photo album) or other collection type of MCPs). Such user-assignment of any suitable user-assigned metadata 330 may be accomplished via any suitable user interface application that may be presented by device 100 and/or server 50 to a user of system 1.

Derived metadata 325 of an MCP 305 may include any suitable types of metadata assets that may be derived or inferred by processor analysis (e.g., by an application 103 of processor 102) of media content 310, captured metadata 315, user-assigned metadata 330, and/or any user actions that may be associated with that MCP 305. One or more framework services (e.g., service(s) of device 100 and/or of server 50) may analyze one or more MCPs 305, their media content, their metadata, and/or any associated user actions to produce derived metadata 325 for one or more of the MCPs. Examples of such derived metadata 325 may include, but are not limited to, derived domain metadata 332, media content-analysis metadata 335 (e.g., image-analysis metadata for an image MCI 310), and/or implicit user metadata 340. Implicit user metadata 340 may be any suitable metadata that may be generated by monitoring any user actions with respect to the MCP (e.g., sharing the MCP with others, repeatedly viewing the MCP, etc.).

Media content-analysis metadata 335 may include any suitable type(s) of metadata attributes that may be determined by analyzing MCP media content 310. In some embodiments, such media content-analysis metadata 335 may include any suitable media attribute score metadata 345 and/or any suitable media content indicator metadata 350. Examples of media attribute score metadata 345 may include, but are not limited to, any suitable media attribute scores for quantifying focus, exposure, blur, sharpness, color attributes, pixel characteristics, pixel intensity values, luminance values, brightness values, andlor the like for any image MCI and/or for any frame(s) of any video MCI, and/or for quantifying volume, pitch, timbre, voice, source (e.g., detected sound is human voice, detected sound is fire truck, etc.) and/or the like for any audio MCI and/or the like for any other type of MCI. Media attribute score metadata 345 may be generated and/or otherwise obtained by one or more suitable services (e.g., framework services) of system 1 (e.g., of device 100 and/or of server 50). Examples of media content indicator metadata 350 may include, but are not limited to, any suitable media content indicators that may be indicative of the type of its associated MCI 310 and/or that may characterize its associated MCI 310 in any suitable manner. In an example when an MCI 310 is an image, one or more media content indicators of associated media content indicator metadata 350 may reference one or more types of particular content indicators that may be valid for that image. Additionally or alternatively, when an MCI 310 may be a video clip with multiple frames or images, one or more media content indicators of associated media content indicator metadata 350 may be expressed in terms of ranges that may define the range of images or frames over which a particular content indicator may be valid. Examples of particular types of content indicators of media content indicator metadata 350 may include, but are not limited to, face indicators (e.g., unique face vectors (or any other suitable statistical representations)), smile indicators, voice indicators, camera motion indicators, junk content indicators, scene indicators, image quality indicators, and/or the like. Any such content indicators 350 may be generated or obtained (e.g., as one or more feature vectors or feature indicators) by one or more suitable services (e.g., framework services) of system 1 (e.g., of device 100 and/or of server 50).

Derived domain metadata 332 may include any suitable data associated with any suitable domain type(s) that may be associated with the MCP by analyzing the metadata already associated with the MCP. For example, in some embodiments, a domain type may be a location domain and any captured location metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived location metadata 332 that may be indicative of one or more location regions and/or one or more location areas (e.g., areas of interest) and/or one or more location designations (e.g., home, residence, office, etc.) and/or the like that may enable the MCP to be grouped with other MCPs. As another example, a domain type may be a time domain and any captured time metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived time metadata 332 that may be indicative of one or more time quantifications (e.g., weekday, season, etc.) and/or one or more time event designations (e.g., holiday, Halloween, etc.) and/or the like that may enable the MCP to be grouped with other MCPs. As another example, a domain type may be a person domain and any captured person metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived person metadata 332 that may be indicative of one or more person quantifications (e.g., person names and/or person relationships, such as John Doe ("user"), Jane Doe ("user's wife"), Jenn Doe ("user's daughter"), unverified person (unknown relationship), Jim James ("user's co-worker"), etc.) and/or one or more person event designations (e.g., anniversary, birthday, etc.) and/or one or more person social group designations (e.g., co-worker social group of John Doe and Jim James, any social group collection of identities that may be identified to appear together often (e.g., in different moments, at different events, etc.), etc.) and/or the like that may enable the MCP to be grouped with other MCPs. As another example, a domain type may be a place domain and any captured place metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived place metadata 332 that may be indicative of one or more points of interest ("POIs") and/or regions of interest ("ROIs") (e.g., nature, water, mountain, urban, beach, nightlife, restaurant, entertainment, park, culture, travel, shopping, etc.) and/or the like that may enable the MCP to be grouped with other MCPs. As another example, a domain type may be a scene domain and any captured scene metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived scene metadata 332 that may be indicative of one or more scenes (e.g., animal (e.g., bird, reptile, dog, fish, etc.), outdoor (e.g., sky, sand, playground, etc.), celebration (e.g., wedding, birthday cake, jack-o-lantern, etc.), structure (e.g., fireplace, aquarium, etc.), vehicle (e.g., helicopter, bicycle, limousine, etc.), recreation (e.g., performance (e.g., orchestra, karaoke, rodeo, etc.), sport (e.g., rafting, surfing, scuba, etc.), etc.), plant (e.g., flower, tree, etc.), game (e.g., poker, foosball, etc.), fire, liquid (e.g., jacuzzi, river, etc.), art (e.g., origami, balloon, etc.), light (e.g., chandelier, candle, etc.), room (e.g., bar, museum, restaurant, etc.), people, etc.) and/or the like that may enable the MCP to be grouped with other MCPs. As another example, a domain type may be a moment domain and any captured moment metadata of captured metadata 315, explicit user metadata 330, media content-analysis metadata 335 (e.g., media attribute score(s) 345 and/or content indicator(s) 350), and/or implicit user metadata 340 and/or other derived metadata 325 for any MCP or collection of MCPs may be analyzed with or without any contextual data in order to associate an MCP with any suitable derived moment metadata 332 that may be indicative of a moment (e.g., a distinct range of times and a distinct location or distinct range of locations) and/or the like that may enable the MCP to be grouped with other MCPs. As described in more detail with respect to FIG. 4, for example, one or more applications or services (e.g., a framework services) of system 1 (e.g., of processor 102 and/or server 50) may be operative to generate and/or use an MCP management system 107 (e.g., a database and/or a knowledge graph metadata network (e.g., a hierarchical directed acyclic graph ("DAG") structure that may include nodes corresponding to different domain types and different specific sub-domains of each domain type of metadata 311, for example, where derived domain metadata 332 may be defined in terms of node identifiers in the graph structure, and all nodes of the structure may be correlated (e.g., by correlation weights (e.g., confidence weights and/or relevance weights))) to manage, store, ingest, organize, and/or retrieve the various MCPs 305 (e.g., metadata 311 and/or content 310) of library 105. Additional disclosure regarding suitable graph metadata networks can be found in co-pending, commonly-assigned U.S. Patent Application Publication No. 2017/0091154 (published on Mar. 30, 2017) and in co-pending, commonly-assigned U.S. patent application Ser. No. 15/391,269 (filed on Dec. 27, 2016), each of which is hereby incorporated by reference herein in its entirety.

Therefore, there may be various types of metadata assets 311 that may be associated with an MCI 310 of an MCP 305. A particular type of metadata asset may be a first metadata asset 311 of a first MCP 305 associated with a first MCI 310 and may also be a second metadata asset 311 of a second MCP 305 associated with a second MCI 310. In some embodiments, a type of metadata may be categorized as primitive metadata or inferred metadata, which may be determined based at least on primitive metadata. For example, as may be used herein, "primary primitive metadata" may refer to metadata that may describe one or more characteristics or attributes associated with one or more MCIs 310. Some types of primary primitive metadata include, but are not limited to, one or more of time metadata, geo-position metadata, geolocation metadata, people metadata, scene metadata, content metadata, object metadata, and/or sound metadata. Time metadata may refer to a time that may be associated with one or more media content items (e.g., a timestamp associated with a media content item, a time at which the media content item was captured or otherwise generated, a time at which the media content item was modified, a time at which the media content item was stored, a time at which the media content item was transmitted, a time at which the media content item was received, etc.), which may be captured metadata 315. Geo-position metadata may refer to geographic and/or spatial attributes that may be associated with one or more media content items using any suitable location sensing and/or geographic coordinate system (e.g., latitude, longitude, and/or altitude, etc.), which may be captured metadata 315. Geolocation metadata may refer to one or more meaningful locations rather than geographic coordinates that may be associated with one or more media content items, such as a beach (and its name), a street address, a country name, a region, a building, a landmark, and/or the like, which, for example, may be determined by processing geo-position metadata together with data from a map application and/or any other suitable data available to device 100 to determine that the geolocation for a scene in a group of images. People metadata may refer to at least one face that may be detected in at least one media content item (e.g., through any suitable facial recognition technique(s)), where the people metadata may be indicative of a particular identity (e.g., a tagged or otherwise known (e.g., verified) person) or an unknown identity (e.g., an unverified or unknown person), which may be metadata 330 and/or metadata 335. Scene metadata and/or object metadata may refer to an overall description of an activity or situation associated with one or more media content items based on any objects that may be detected therein (e.g., if a media content item includes a group of images, then scene metadata for the group of images may be determined using detected objects in one or more of the images (e.g., the detection of a large cake with candles and/or balloons in at least two images in the group can be used to associate "birthday" scene metadata with each of the images)), where such objects or scene indicators or content indicators may be any suitable objects (e.g., a detected animal, a detected company logo, a detected piece of furniture, a detected instrument, etc.) that may be able to be detected in a media content item using any suitable techniques (e.g., any suitable image processing techniques), which may be metadata 350. Content metadata may refer to any features of a media content item (e.g., pixel characteristics, pixel intensity values, luminance values, brightness values, loudness levels, etc., etc.), which may be metadata 345. Sound metadata may refer to one or more detected sounds associated with one or more media content items a detected sound as a human's voice, a detected sound as a fire truck's siren, etc.), which may be metadata 335.

As used herein, "inferred metadata" may refer to metadata that may describe one or more characteristics or attributes associated with one or more MCIs 310 that is beyond the information that may be provided by primitive metadata. One difference between primitive metadata and inferred metadata may be that primitive metadata may represent an initial set of descriptions of one or more media content items while inferred metadata may provide one or more additional descriptions or characteristics of the one or more media content items based on processing one or more of the primitive metadata assets (e.g., in combination with any suitable contextual data that may be available to device 100). For example, primitive metadata may identify two detected persons in one or a group of images as John Doe and Jane Doe, while inferred metadata may identify John Doe and Jane Doe as a married couple based on processing at least a portion of the primitive metadata (e.g., in combination with any suitable contextual data). Inferred metadata may be determined from at least one of (i) processing of a combination of different types of primary primitive metadata, (ii) processing of a combination of different types of contextual information, and (iii) processing of a combination of primary primitive metadata and contextual information. As used herein, "context" and/or its variations may refer to any or all data that may be accessible to device 100, such as physical, logical, social, and/or other contextual information. As used herein, "contextual information" and/or contextual data and/or contextual metadata and/or its variations may refer to metadata or any other suitable information that may describe or define a user's context or a context of a user's device (e.g., device 100 with access to library 105 (e.g., as may be associated with a user)). Exemplary contextual information may include, but is not limited to, a predetermined time interval, a time event scheduled to occur in a predetermined time interval, a geolocation to be visited in a predetermined time interval, one or more identified persons associated with a predetermined time, an event scheduled for a predetermined time, a geolocation to be visited at predetermined time, weather metadata describing weather associated with a particular period in time (e.g., rain, snow, sun, temperature, etc.), season metadata describing a season associated with capture of a media content item, and/or the like. For example, such contextual information can be obtained from any suitable application data local to device 100 and/or any suitable application data that may be provided by external sources (e.g., a remote server (e.g., server 50 (e.g., via the internet))) from any suitable application or data source, such as a social networking application (e.g., information indicative of relationships between people, planned events with or without known attendees, birthdays, favorite interests (e.g., hobbies, activities, etc.) and/or restaurants and/or media, etc.), a weather application (e.g., information indicative of weather or other environmental conditions at a certain place at a certain time), a calendar application (e.g., information indicative of a scheduled event, scheduled participants, etc.), a contact application (e.g., information indicative of a person's home address, etc.), a health application (e.g., information indicative of a user's heart rate, steps taken, speed, calories burned, food ingested, particular sport, or hobby performed, etc.), a wallet application (e.g., information indicative of a scheduled or attended event, passes for an event, receipts for services and/or goods purchased, etc.), a messaging application or an e-mail application (e.g., information indicative of discussed events, communicating persons, etc.), a map application (e.g., information indicative of places visited, etc.), a photos application itself (e.g., information indicative of any tags or verified face identifications, likes, shares, groupings, albums, and/or the like based on a user's interaction (e.g., input data) with library 105), and/or any other type of application or data source that may be operative to provide information that may be processed (e.g., based on and/or in combination with any known metadata of library 105) to reveal additional characteristics to be associated with one or more media content items (e.g., as new metadata and/or correlations between known metadata (e.g., to define a new node and/or correlation between nodes of a metadata network (e.g., a knowledge graph)), as described in more detail with respect to FIG. 4). Therefore, one or metadata assets of library 105 may be indicative of a person's name, birthplace, birthday, gender, relationship status, identification of related persons, social groups and identities of members of social groups of any type (e.g., family, friends, co-workers, etc.), current and/or prior address(es) of residence and/or vacation and/or work, interests (e.g., hobbies (e.g., pets owned, instruments played, activities enjoyed, restaurants enjoyed, etc.)), places of interest (e.g., visited and/or interested in), etc.), religion, trips taken and associated travelers, events attended and associated attendees, physical activity (e.g., workouts or sports or hobbies or activities performed or enjoyed), and/or the like. The preceding examples are illustrative and not restrictive.

Two categories of inferred metadata may be referred to herein as primary inferred metadata and auxiliary inferred metadata. Primary inferred metadata may include time event metadata that may describe one or more time events associated with one or more media content items. For example, if a media content item or a collection of media content items is associated with primary primitive metadata indicative of a particular time or a particular range of times and/or a particular location, then associated primary inferred metadata may be determined to include time event metadata that may describe one or more time events or people events associated with such time and/or location information (e.g., a vacation, a birthday, a sporting event, a concert, a graduation ceremony, a dinner, a project, a work-out session, a traditional holiday, etc.), where such primary inferred metadata may, in some embodiments, be determined by analyzing such primary primitive metadata alone or in combination with any suitable contextual metadata (e.g., calendar data and/or social media data, etc.). Auxiliary inferred metadata may be any suitable metadata including, but not limited to, geolocation relationship metadata, person relationship metadata, object relationship metadata, and sound relationship metadata. Geolocation relationship metadata may refer to a relationship between one or more known persons associated with one or more media content items and one or more locations associated with the one or more media content items. For example, an analytics engine or data mining technique can be used to determine that a scene associated with one or more media content items of John Doe represents John Doe's home. Person relationship metadata may refer to a relationship between one or more known persons associated with one or more media content items and one or more other known persons associated with the one or more media content items. For example, an analytics engine or data mining technique can be used to determine that Jane Doe (who appears in one or more images with John Doe) is John Doe's wife. Object relationship metadata may refer to a relationship between one or more known persons associated with one or more media content items and one or more known objects associated with the one or more media content items. For example, an analytics engine or data mining technique can be used to determine that a boat appearing in one or more images with John Doe is owned by John Doe. Sound relationship metadata may refer to a relationship between one or more known sounds associated with one or more media content items and one or more known persons associated with the one or more media content items. For example, an analytics engine or data mining technique can be used to determine that a voice that appears in one or more videos with John Doe is John Doe's voice.

Inferred metadata may be determined or inferred from primitive metadata and/or contextual information by performing any suitable type(s) of processing, including, but not limited to, data mining primitive metadata and/or contextual information; analyzing primitive metadata and/or contextual information, applying logical rules to primitive metadata and/or to contextual information, and/or any other known methods that may be used to infer new information from provided or acquired information. In some embodiments, primitive metadata can be extracted from inferred metadata. For example, primary primitive metadata (e.g., time metadata, geolocation metadata, scene metadata, etc.) can be extracted from primary inferred metadata (e.g., time event metadata, etc.). Techniques for determining inferred metadata and/or extracting primitive metadata from inferred metadata can be iterative. For example, inferring metadata can trigger the inference of other metadata and so on. As another example, extracting primitive metadata from inferred metadata can trigger inference of additional inferred metadata or extraction of additional primitive metadata.

Figure 4:
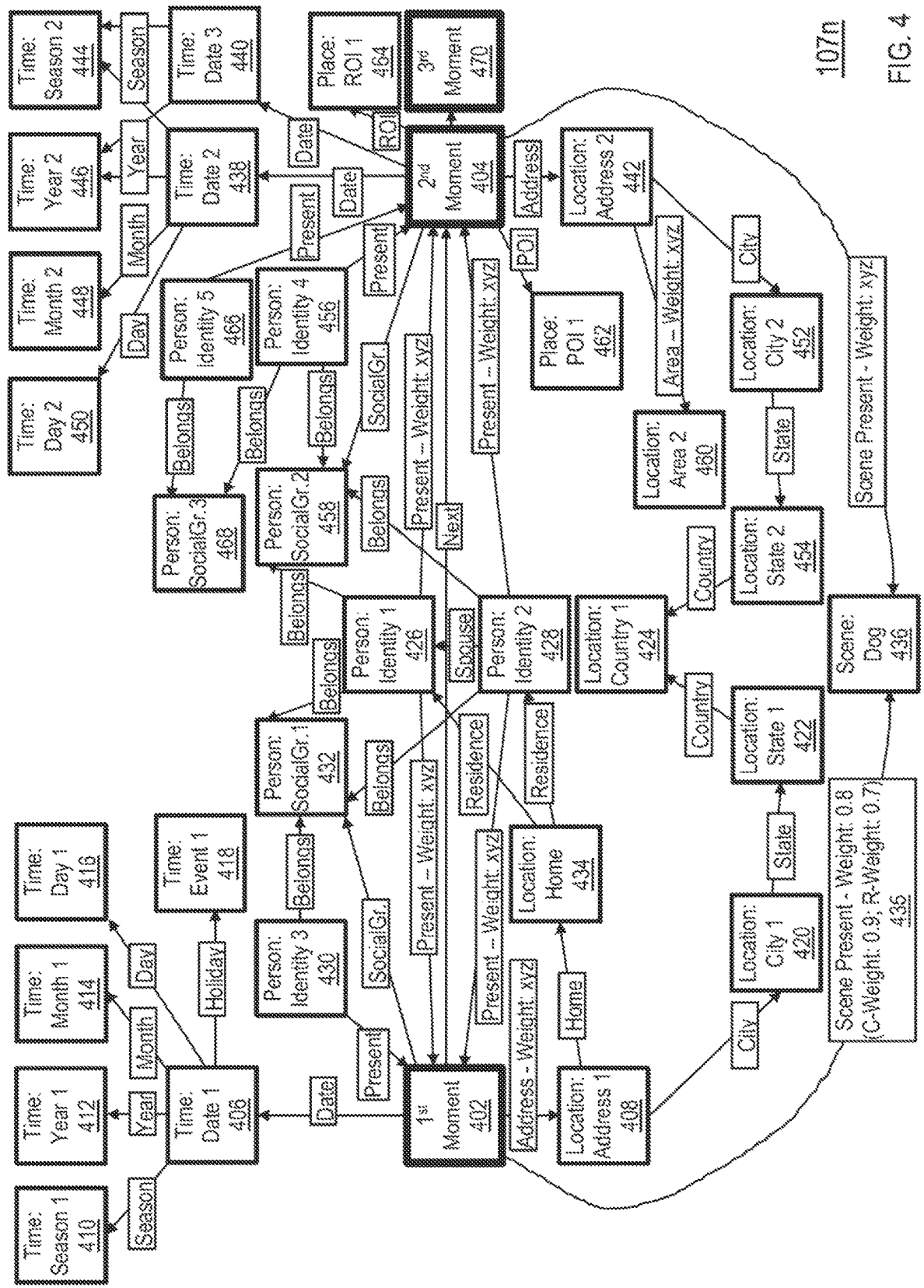
FIG. 4 is an exemplary block diagram of a portion of an illustrative metadata network of the system of FIGS. 1 and 2.

FIG. 4 shows, in block diagram form, an exemplary portion 107n of a type of MCP management system 107, which may be provided by any suitable graph structure, such as a DAG structure or otherwise, and may also be referred to herein as a knowledge graph metadata network or knowledge graph or metadata network 107n. While an MCP management system may, alternatively, be provided by any suitable database (e.g., a relational database, a distributed database, an object-oriented programming database, etc.), using such a database for management of a library of MCPs may be too resource-intensive (e.g., substantial computational resources may be needed to manage the MCPs (e.g., substantial processing power may be needed for performing queries or transactions, storage memory space for storing the necessary databases, etc.)) and/or may not be as easily implemented on a computing system with limited storage capacity (e.g., device 100), thereby requiring certain functionality of a remote subsystem (e.g., remote server 50). Instead, in some embodiments, MCP management system 107 may be at least partially provided as a metadata network 107n, at least an exemplary portion of which may be shown in FIG. 4, that may include correlated metadata assets that may describe characteristics associated with various MCIs 310 of MCPs 305 of library 105, where such a metadata network may be operative to manage library 105 locally on device 100 (e.g., with processing circuitry 102) without the need for any external data sources (e.g., remote server 50). Each metadata asset may be a type of metadata 311 that may be associated with and that may describe or otherwise be indicative of at least characteristic of one or more MCIs 310 of one or more MCPs 305 of library 105. As a non-limiting example, a metadata asset can describe a characteristic associated with multiple MCIs 310 (e.g., a metadata asset may be metadata 311 of two or more different MCPs 305) in library 105. Each metadata asset can be represented as a node in metadata network 107n. A metadata asset can be correlated with at least one other metadata asset. Each correlation between metadata assets can be represented as an edge in the metadata network that is between the nodes representing the correlated metadata assets.

Device 100 (e.g., processing circuitry 102) may include any suitable processing unit(s), such as one or more central processing units ("CPUs"), one or more graphics processing units ("GPUs"), other integrated circuits ("ICs"), memory, and/or other electronic circuitry. Such processing unit(s) may include any suitable MCP management logic/modules, which may be implemented as hardware (e.g., electronic circuitry associated with processing circuitry 102, dedicated logic, etc.), software (e.g., one or more instructions associated with a computer program (e.g., application 103) that may be executed by processing circuitry 102, software run on a general-purpose computer system or a dedicated machine, etc.), or a combination thereof, for generating and/or maintaining and/or otherwise operating MCP management system 107 by manipulating and/or otherwise processing any suitable data of library 105 and any other suitable data (e.g., contextual data) available to device 100 (e.g., social media application data, contact application data, weather application data, health application data, calendar application data, messaging application data, e-mail application data, and/or the like). Therefore, device 100 and/or any other portion(s) of system 1 (e.g., server 50) may be operative to generate and use a knowledge graph metadata network 107n as a multi-dimensional network, which may be a dynamically organized collection of metadata assets of metadata 311 of MCPs 305 of library 105 but which may not include any media content items 310 of such MCPs 305, and/or which may be used for deductive reasoning. For example, device 100 may be operative to (i) generate metadata network 107n, (ii) relate and/or present at least two MCIs 310 based on metadata network 107n, (iii) determine and/or present interesting MCIs 310 of library 105 based on metadata network 107n and predetermined criterion, (iv) select and/or present representative MCIs 310 to summarize a collection (e.g., a moment) of media content items based on input specifying the representative group's size, (v) use metadata network 107n to reduce a number of unverified persons detected in media content 310, (vi) use metadata network 107n to determine a mood of a collection (e.g., a moment) of media content items, and/or (vii) use metadata network 107n to define a collection of media content items for a relevant interest.

Metadata network 107n may enable deep connections between metadata using multiple dimensions in the metadata network, which can be traversed for additionally deduced correlations. Each dimension in the metadata network may be viewed as a grouping of metadata based on metadata type. For example, a grouping of metadata may be all time metadata assets in a metadata collection (e.g., all metadata 311 of library 105) and another grouping could be all geo-position metadata assets in the same metadata collection. Thus, in such an example, a time dimension may refer to all time metadata assets in the metadata collection and a geo-position dimension may refer to all geo-position metadata assets in the same metadata collection. Furthermore, the number of dimensions can vary based on constraints. Constraints may include, but are not limited to, a desired use for the metadata network, a desired level of detail, and/or the available metadata or computational resources that may be used to implement the metadata network. For example, the metadata network can include only a time dimension, the metadata network can include all types of primitive metadata dimensions, and/or the like. With regard to the desired level of detail, each dimension can be further refined based on specificity of the metadata. That is, each dimension in the metadata network may be a grouping of metadata based on metadata type and the granularity of information may be described by the metadata. For a first example, there may be two time dimensions in the metadata network, where a first time dimension may include all time metadata assets classified by week and a second time dimension may include all time metadata assets classified by month. For a second example, there may be two geolocation dimensions in the metadata network, where a first geolocation dimension may include all geolocation metadata assets classified by type of establishment (e.g., home, business, etc.) and a second geolocation dimension that may include all geolocation metadata assets classified by country. The preceding examples are merely illustrative and not restrictive. It is to be appreciated that the level of detail for dimensions can vary depending on designer choice, application, available metadata, and/or available computational resources.

Metadata network 107n may be a multi-dimensional network of MCP metadata 311. As used herein, a "multi-dimensional network" and its variations may refer to a graph (e.g., a complex graph) having multiple kinds of relationships. A multi-dimensional network generally may include multiple nodes and edges, where, in some embodiments, the nodes may represent metadata and the edges may represent relationships or correlations between the metadata. Exemplary multi-dimensional networks include, but are not limited to, edge-labeled multigraphs, multipartite edge-labeled multigraphs, DAGs, and multilayer networks. In some embodiments, the nodes in metadata network 107n may represent metadata assets of MCP metadata 311, for example, where each node may represent a particular metadata asset that may be associated with one or more MCIs 310 and MCPs 305 of library 105 (e.g., a first node may be a first metadata asset that may not only be a part of first metadata 311 associated with a first MCI 310 of a first MCP 305 of library 105 but that may also be a part of second metadata 311 associated with a second MCI 310 of a second MCP 305 of library 105. As another example, each node may represent a metadata asset that may be associated with a group of MCIs in a collection. As used herein, a "metadata asset" and its variations may refer to metadata (e.g., a single instance of metadata, a group of multiple instances of metadata, etc.) that may describe one or more characteristics of one or more MCIs in a library. As such, there may be a primitive metadata asset, an inferred metadata asset, and/or the like. For a first example, a primary primitive metadata asset may refer to a time metadata asset describing a time interval between Jun. 1, 2016 and Jun. 3, 2016 when one or more MCIs may have been captured. For a second example, a primary primitive metadata asset may refer to a geo-position metadata asset that may describe one or more latitudes and/or longitudes where one or more MCIs may have been captured. For a third example, an inferred metadata asset may refer to a time event metadata asset that may describe a holiday of Halloween.

Metadata network 107n may be configured to include two types of nodes, such as moment nodes and non-moments nodes. As used herein, a "moment" may refer to a single event (e.g., as may be described by an event or moment metadata asset) that may be associated with one or more MCIs. For example, a moment may refer to a vacation in Paris, France that lasted between Jun. 1, 2016 and Jun. 9, 2016 or to a Halloween party on Halloween afternoon at a person's home. For this example, the moment can be used to identify one or more MCIs 310 (e.g., one image, a group of images, a video, a group of videos, a song, a group of songs, etc.) that may be associated with the vacation in Paris, France that lasted between Jun. 1, 2016 and Jun. 9, 2016 or that may be associated with the afternoon Halloween party at a person's home. As used herein, a "moment node" may refer to a node in a multi-dimensional network, such as metadata network 107n, that may represent a moment. Thus, a moment node may refer to a metadata asset (e.g., a primary inferred metadata asset) that may represent a single event or moment that may be associated with one or more MCIs. As used herein, a "non-moment node" may refer to a node in a multi-dimensional, such as metadata network 107n, that may not represent a moment. Thus, a non-moment node may refer to at least one of a primary primitive metadata asset associated with one or more MCIs or an inferred metadata asset associated with one or more MCIs that is not a moment (i.e., not a moment metadata asset). As used herein, an "event" and its variations may refer to a situation or an activity that may be occurring at one or more locations during a specific time interval. An event may include, but is not limited to, one or more of a gathering of one or more persons to perform an activity (e.g., a holiday, a vacation, a birthday, a dinner, a project, a work-out session, etc.), a sporting event (e.g., an athletic competition, etc.), a ceremony (e.g., a ritual of cultural significance that is performed on a special occasion, etc.), a meeting (e.g., a gathering of individuals engaged in some common interest, etc.), a festival (e.g., a gathering to celebrate some aspect in a community, etc.), a concert (e.g., an artistic performance, etc.), a media event (e.g., an event created for publicity, etc.), a party (e.g., a large social or recreational gathering, etc.), and/or the like. While network 107n may be described with respect to moment nodes and non-moment nodes such that all nodes may be related via a moment dimension (e.g., a time dimension, as each moment node may be associated with a discrete duration/range of time), network 107n may alternatively be described with respect to "visit" nodes and non-visit nodes such that all nodes may be related via a visit dimension (e.g., a location dimension, where each visit node may be associated with a discrete geographic location/range of locations, not beholden to any particular time frame), or with respect to any other type of nod/dimension(s) delineation.

Edges in metadata network 107n between nodes may represent relationships or correlations between the nodes. For example, system 1 may update metadata network 107n as new metadata 311 is obtained. System 1 may be configured to manage MCIs 310 of library 105 using metadata network 107n, such as to relate multiple MCIs based on the correlations (e.g., the edges in metadata network 107n) between metadata assets associated with the MCIs (e.g., the nodes of metadata network 107n). For example, a first group of one or more MCIs 310 may be related to a second group of one or more MCIs based on the metadata assets that may be represented as moment nodes in metadata network 107n. As another example, metadata network 107n may be used to identify and present or otherwise utilize interesting groups of one or more MCIs 310 in library 105 based on certain correlations (e.g., certain edges in metadata network 105) between metadata assets associated with the MCIs (e.g., the nodes in metadata network 107n) and any suitable predetermined criterion, where the interesting groups of MCIs may be selected based on moment nodes in metadata network 107n and such predetermined criterion may refer to any suitable contextual information. It is to be appreciated that metadata network 107n of FIG. 4 is exemplary and that every node that can be generated by system 1 is not shown. For example, even though every possible node is not illustrated in FIG. 4, system 1 may be operative to generate a node to represent each metadata asset of library 105.

In metadata network 107n of FIG. 4, nodes representing metadata may be illustrated as boxes while edges representing correlations between metadata may be illustrated as labeled connections between boxes. Furthermore, moment nodes (e.g., a first moment node 402, a second moment node 404, and a third moment node 470) may be represented as boxes with thickened boundaries while other non-moment nodes (e.g., nodes 406-468) may lack such thickened boundaries. System 1 (e.g., processing circuitry 102) may be operative to define nodes based on metadata 311 associated with MCIs 310 of MCPs 305 of library 105, and, as additional metadata 311 is determined (e.g., as new metadata is captured, assigned, inferred, derived, and/or the like (e.g., as additional MCIs 310 are captured or added to library 105 and/or as additional explicit user actions are taken and/or as additional contextual data is made available to system 1), additional nodes and/or edges may be generated and added to metadata network 107n.

As shown, metadata network 107n may include a first moment metadata asset node 402 and a second moment metadata asset node 404. Any moment node may be generated for a particular moment that may be identified by system 1 based on library 105 in any suitable manner For example, when at least a threshold amount of MCIs 310 are identified to be associated with time metadata within a particular time range and with location metadata within a particular location range, then those identified MCIs 310 may be associated with a moment metadata asset that is descriptive of that time range and location range (e.g., a moment that may be indicative of an interesting event that took place during that time range at that location(s) due to at least a threshold amount of MCIs being captured). Alternatively, a particular subset of MCIs 310 of library 105 may be associated with a particular moment metadata asset in any other suitable manner. As just one particular example, which may be referred to herein with respect to metadata network 107n of FIG. 4, first moment metadata asset node 402 may be defined to represent first moment metadata indicative of a first moment that may be based on a particular time range of 2:00 PM to 4:00 PM on Oct. 31, 2009 and for a particular location range (e.g., within 100 feet) of a particular geographic coordinate (e.g., a particular address), such as a user's home at 22 Skyline Drive in Wellesley, Mass., 02482, U.S.A., where such a first moment may be defined as a result of at least a certain number of MCIs 310 being identified in library 105 that are associated with time metadata 311 indicative of any time within that time range and with location metadata 311 indicative of any location within that location range (e.g., when many MCIs are captured at a Halloween party at a person's home), while second moment metadata asset node 404 may be defined to represent second moment metadata indicative of a second moment that may be based on a particular time range of Jun. 30, 2016 through Jul. 1, 2016 and for a particular location range (e.g., within the city limits of a particular city), such as within New York City, N.Y., U.S.A., where such a second moment may be defined as a result of at least a certain number of MCIs 310 being identified in library 105 that are associated with time metadata 311 indicative of any time within that time range and with location metadata 311 indicative of any location within that location range (e.g., when many MCIs are captured during a vacation to New York City), where each one of such MCIs associated with second moment 404 may be different than each one of such MCIs associated with first moment 402. Although only two moment nodes may be shown in FIG. 4, network 107n may include more than two moment nodes, each associated with a particular moment of a particular time range and a particular geographic range. Two moment nodes may be correlated by advancement of time (e.g., second moment metadata asset node 404 associated with the year 2016 may be after first moment metadata asset node 402 associated with the year 2009, as may be shown by the edge labelled "Next" between nodes 402 and 404).

Any suitable nodes may be associated with any suitable metadata assets and may be defined within network 107n and correlated with one or more moment nodes and/or one or more non-moment nodes. As shown, first moment metadata asset node 402 may be correlated (e.g., by date) with at least one time date metadata asset node 406 that may be defined to represent time date metadata indicative of a first date (e.g., Oct. 31, 2009) and/or may be correlated (e.g., by address) with at least one location address metadata asset node 408 that may be defined to represent location address metadata indicative of a first address (e.g., 22 Skyline Drive, Wellesley, Mass., 02482, U.S.A. or an associated geographic coordinate system (e.g., latitude, longitude, and/or altitude)). At least one MCI 310 of library 105 may be associated with first moment metadata represented by moment node 402 and time metadata represented by time node 406 and location metadata represented by location node 408. As shown, time date metadata asset node 406 (e.g., indicative of Oct. 31, 2009) may be correlated (e.g., by season) with a time season metadata asset node 410 that may be defined to represent time season metadata indicative of a first season (e.g., Fall) and/or may be correlated (e.g., by year) with a time year metadata asset node 412 that may be defined to represent time year metadata indicative of a first year (e.g., 2009) and/or may be correlated (e.g., by month) with a time month metadata asset node 414 that may be defined to represent time month metadata indicative of a first month (e.g., October) and/or may be correlated (e.g., by day) with a time day metadata asset node 416 that may be defined to represent time day metadata indicative of a first day (e.g., 31) and/or may be correlated (e.g., by holiday) with a time holiday metadata asset node 418 that may be defined to represent time holiday metadata indicative of a first holiday (e.g., Halloween), and, although not shown, it is to be understood that time date metadata asset node 406 may be correlated with any other suitable types of metadata asset nodes within network 107n, including, but not limited to, a time day of week metadata asset node that may be defined to represent time day of week metadata indicative of a day of week (e.g., Saturday) and/or the like. Additionally or alternatively, as shown, location address metadata asset node 408 (e.g., indicative of 22 Skyline Drive, Wellesley, Mass., 02482, U.S.A.) may be correlated (e.g., by city) with a location city metadata asset node 420 that may be defined to represent location city metadata indicative of a first city (e.g., Wellesley), which may be correlated (e.g., by state) with a location state metadata asset node 422 that may be defined to represent location state metadata indicative of a first state (e.g., Massachusetts), which may be correlated (e.g., by country) with a location country metadata asset node 424 that may be defined to represent location country metadata indicative of a first country (e.g., United States of America), and, although not shown, it is to be understood that location address metadata asset node 408 may be correlated (e.g., directly or via another node) with any other suitable types of metadata asset nodes within network 107n, including, but not limited to, a location ZIP code metadata asset node that may be defined to represent location ZIP code metadata indicative of a ZIP code and/or the like.

Additionally or alternatively, as shown, first moment metadata asset node 402 may be correlated (e.g., by presence) with at least one person identity metadata asset node, such as a person identity metadata asset node 426 that may be defined to represent person identity metadata indicative of a first identity (e.g., John Doe) and/or a person identity metadata asset node 428 that may be defined to represent person identity metadata indicative of a second identity (e.g., Jane Doe) and/or a person identity metadata asset node 430 that may be defined to represent person identity metadata indicative of a third identity (e.g., a first unknown person), while person identity metadata asset node 428 may be correlated (e.g., by spouse) with person identity metadata asset node 426 (e.g., when the first identity (e.g., John Doe) and the second identity (e.g., Jane Doe) are determined to be each other's spouse). At least one MCI 310 of library 105 may be associated with first moment metadata represented by moment node 402 and person metadata represented by person node 426, at least one MCI 310 of library 105 may be associated with first moment metadata represented by moment node 402 and person metadata represented by person node 428, and at least one MCI 310 of library 105 may be associated with first moment metadata represented by moment node 402 and person metadata represented by person node 430. Network 107n may also include a person social group metadata asset node 432 that may be defined to represent person social group metadata indicative of a first social group and that may be correlated (e.g., by social group) with moment node 402, and each one of person identity metadata asset node 426 and person identity metadata asset node 428 and person identity metadata asset node 430 may be correlated (e.g., by belonging) with person social group metadata asset node 432 (e.g., when the first identity (e.g., John Doe) and the second identity (e.g., Jane Doe) and the third identity (e.g., the first unknown person) are determined to be of a particular social group). Network 107n may also include a location home metadata asset node 434 that may be defined to represent location home metadata indicative of a first home or residence, and location address metadata asset node 408 may be correlated (e.g., by home) with location home metadata asset node 434 (e.g., when the first address (e.g., 22 Skyline Drive, Wellesley, Mass., 02482, U.S.A.) is determined to be a home or residence), while each one of person identity metadata asset node 426 and person identity metadata asset node 428 may be correlated (e.g., by residence) with location home metadata asset node 434 (e.g., when each one of the first identity (e.g., John Doe) and the second identity (e.g., Jane Doe) is determined to reside at the first home). Additionally or alternatively, as shown, first moment metadata asset node 402 may be correlated (e.g., by presence) with at least one scene metadata asset node, such as a scene metadata asset node 436 that may be defined to represent scene metadata indicative of a first scene (e.g., a dog). At least one MCI 310 of library 105 may be associated with first moment metadata represented by moment node 402 and scene metadata represented by scene node 436.

Second moment metadata asset node 404 may be correlated (e.g., by date) with at least one time date metadata asset node 438 that may be defined to represent time date metadata indicative of a second date (e.g., Jun. 30, 2016) and/or may be correlated (e.g., by date) with at least one other time date metadata asset node 440 that may be defined to represent time date metadata indicative of a third date (e.g., Jul. 1, 2016) and/or may be correlated (e.g., by address) with at least one location address metadata asset node 442 that may be defined to represent at least one location address metadata indicative of a second address (e.g., 350 5$^{th}$ Avenue, New York, N.Y. 10118, U.S.A. or an associated geographic coordinate system (e.g., latitude, longitude, and/or altitude)). At least one MCI 310 of library 105 may be associated with second moment metadata represented by moment node 404 and location metadata represented by location node 408 and at least one of time metadata represented by time node 438 and time metadata represented by time node 440. As shown, time date metadata asset node 438 (e.g., indicative of Jun. 30, 2016) may be correlated (e.g., by season) with a time season metadata asset node 444 that may be defined to represent time season metadata indicative of a second season (e.g., Summer) and/or may be correlated (e.g., by year) with a time year metadata asset node 446 that may be defined to represent time year metadata indicative of a second year (e.g., 2016) and/or may be correlated (e.g., by month) with a time month metadata asset node 448 that may be defined to represent time month metadata indicative of a second month (e.g., June) and/or may be correlated (e.g., by day) with a time day metadata asset node 450 that may be defined to represent time day metadata indicative of a second day (e.g., 30), and, although not shown, it is to be understood that time date metadata asset node 438 may be correlated with any other suitable types of metadata asset nodes within network 107n, including, but not limited to, a time day of week metadata asset node that may be defined to represent time day of week metadata indicative of a day of week (e.g., Thursday) and/or the like. Additionally or alternatively, as shown, time date metadata asset node 440 (e.g., indicative of Jul. 1, 2016) may be correlated (e.g., by season) with time season metadata asset node 444 that may be defined to represent time season metadata indicative of the second season (e.g., Summer) and/or may be correlated (e.g., by year) with a time year metadata asset node 446 that may be defined to represent time year metadata indicative of the second year (e.g., 2016) and/or may be correlated (e.g., by month) with a time month metadata asset node (not shown) that may be defined to represent time month metadata indicative of a third month (e.g., July) and/or may be correlated (e.g., by day) with a time day metadata asset node (not shown) that may be defined to represent time day metadata indicative of a third day (e.g., 1), and, although not shown, it is to be understood that time date metadata asset node 440 may be correlated with any other suitable types of metadata asset nodes within network 107n, including, but not limited to, a time day of week metadata asset node that may be defined to represent time day of week metadata indicative of a day of week (e.g., Friday) and/or the like. Additionally or alternatively, as shown, location address metadata asset node 442 (e.g., indicative of 350 5$^{th}$ Avenue, New York, N.Y. 10118, U.S.A.) may be correlated (e.g., by city) with a location city metadata asset node 452 that may be defined to represent location city metadata indicative of a second city (e.g., New York City), which may be correlated (e.g., by state) with a location state metadata asset node 454 that may be defined to represent location state metadata indicative of a second state (e.g., New York), which may be correlated (e.g., by country) with location country metadata asset node 424 that may be defined to represent location country metadata indicative of the first country (e.g., United States of America), and, although not shown, it is to be understood that location address metadata asset node 442 may be correlated (e.g., directly or via another node) with any other suitable types of metadata asset nodes within network 107n, including, but not limited to, a location ZIP code metadata asset node that may be defined to represent location ZIP code metadata indicative of a ZIP code and/or the like.

Additionally or alternatively, as shown, second moment metadata asset node 404 may be correlated (e.g., by presence) with at least one person identity metadata asset node, such as person identity metadata asset node 426 that may be defined to represent person identity metadata indicative of the first identity (e.g., John Doe) and/or person identity metadata asset node 428 that may be defined to represent person identity metadata indicative of the second identity (e.g., Jane Doe) and/or a person identity metadata asset node 456 that may be defined to represent person identity metadata indicative of a fourth identity (e.g., Jenn Doe) and/or a person identity metadata asset node 466 that may be defined to represent person identity metadata indicative of a fifth identity (e.g., a second unknown person). Although not shown, person identity metadata asset node 456 may be correlated (e.g., by offspring) with person identity metadata asset node 426 and with person identity metadata asset node 428 (e.g., when the fourth identity (e.g., Jenn Doe) is determined to be the offspring of the first identity (e.g., John Doe) and of the second identity (e.g., Jane Doe)). At least one MCI 310 of library 105 may be associated with second moment metadata represented by moment node 404 and person metadata represented by person node 426, at least one MCI 310 of library 105 may be associated with second moment metadata represented by moment node 404 and person metadata represented by person node 428, at least one MCI 310 of library 105 may be associated with second moment metadata represented by moment node 404 and person metadata represented by person node 456, and at least one MCI 310 of library 105 may be associated with second moment metadata represented by moment node 404 and person metadata represented by person node 466. Network 107*n* may also include a person social group metadata asset node 458 that may be defined to represent person social group metadata indicative of a second social group and that may be correlated (e.g., by social group) with moment node 404, and each one of person identity metadata asset node 426 and person identity metadata asset node 428 and person identity metadata asset node 456 may be correlated (e.g., by belonging) with person social group metadata asset node 458 (e.g., when the first identity (e.g., John Doe) and the second identity (e.g., Jane Doe) and the fourth identity (e.g., Jenn Doe) are determined to be of a particular social group (e.g., a family)), while it is to be noted that person identity metadata asset node 466 may not be correlated with person social group metadata asset node 458 (e.g., when the fifth identity (e.g., second unknown person) is determined not to be of a particular social group (e.g., a family)). However, network 107*n* may also include a person social group metadata asset node 468 that may be defined to represent person social group metadata indicative of a third social group and that may be correlated (e.g., by social group (not shown)) with moment node 402, and each one of person identity metadata asset node 456 and person identity metadata asset node 466 may be correlated (e.g., by belonging) with person social group metadata asset node 468 (e.g., when the fourth identity (e.g., Jenn Doe) and the fifth identity (e.g., second unknown person) are determined to be of a particular social group). Network 107*n* may also include a location area metadata asset node 460 that may be defined to represent location area metadata indicative of a first area (e.g., an area of interest), such as the Empire State Building, and location address metadata asset node 442 may be correlated (e.g., by area) with location area metadata asset node 460 (e.g., when the second address (e.g., 350 5$^{th}$ Avenue, New York, N.Y. 10118, U.S.A.) is determined to be a particular area (e.g., an area of interest)). Additionally or alternatively, as shown, second moment metadata asset node 404 may be correlated (e.g., by point of interest ("POI")) with at least one place POI metadata asset node, such as a place POI metadata asset node 462 that may be defined to represent place POI metadata indicative of a first POI (e.g., culture). At least one MCI 310 of library 105 may be associated with second moment metadata represented by moment node 404 and place POI metadata represented by place POI node 462. Additionally or alternatively, as shown, second moment metadata asset node 404 may be correlated (e.g., by region of interest ("ROI")) with at least one place ROI metadata asset node, such as a place ROI metadata asset node 464 that may be defined to represent place ROI metadata indicative of a first ROI (e.g., urban). At least one MCI 310 of library 105 may be associated with second moment metadata represented by moment node 404 and place ROI metadata represented by place ROI node 464. Additionally or alternatively, as shown, second moment metadata asset node 404 may be correlated (e.g., by presence) with at least one scene metadata asset node, such as scene metadata asset node 436 that may be defined to represent scene metadata indicative of the first scene (e.g., a dog). At least one MCI 310 of library 105 may be associated with second moment metadata represented by moment node 404 and scene metadata represented by scene node 436.

It is to be understood that FIG. 4 is just exemplary of what may only be a portion of one illustrative metadata network 107*n* of system 1. For example, any node of FIG. 4 may be correlated with one or more other nodes of network 107*n* not shown in FIG. 4. For example, person identity metadata node 426 may be correlated (not shown) with one or more additional moment metadata nodes of network 107*n* in addition to moment nodes 402 and 404 (e.g., a third moment node 470 that may be representative of third moment metadata indicative of a third moment after the second moment represented by moment node 404). Additionally or alternatively, location country metadata node 424 may be correlated with one or more additional location nodes of network 107*n* in addition to location nodes 422 and 454. Additionally or alternatively, moment node 404 may be correlated with one or more additional location nodes of network 107*n* in addition to location node 442 (e.g., one or more MCIs 310 of library 105 may be associated with second moment metadata represented by moment node 404 and location address metadata other than the location address represented by location address node 442 (e.g., another MCI 310 associated with moment node 404 may be associated with third location address metadata indicative of a third location address other than 350 5$^{th}$ Avenue, New York, N.Y. 10118, (e.g., an address associated with another area of interest other than the Empire State Building))). Network 107*n* may be further populated with one or more additional nodes and/or one or more additional edges between nodes when one or more new metadata assets may be determined and associated with one or more MCIs already associated with moment metadata represented by one of moment node 402 and moment 404 and/or when one or more new MCIs may be associated with moment metadata represented by one of moment node 402 and moment node 404 and/or when further processing is carried out by system 1 on any existing metadata and/or contextual data available to system 1. It is to be appreciated that certain metadata assets and their respective nodes may be associated with individual MCIs and/or with other nodes (e.g., moment nodes) that may be associated with individual MCIs or groups of MCIs. For example, a moment node may be associated with each MCI in a group of MCIs, where each MCI in the group of MCIs may be associated with time metadata indicative of a time within the time range of the moment and/or may be associated with location metadata indicative of a location within the location range of the moment. As another example, a scene node (e.g., scene metadata asset node 436 that may be defined to represent scene metadata indicative of a first scene (e.g., a dog)) may be correlated with moment node 402, which may be associated with each MCI that has time and/or location metadata related to the time and location constraints of the moment, while only one or some but not all of those MCIs may be associated with scene metadata indicative of the scene represented by the scene node. Therefore, a scene node may be correlated to a moment node that is associated with a group of MCIs, while the scene node may also be directly associated with only one or some (or maybe all) of the MCIs of that group.

System 1 may be configured to generate additional nodes based on moment nodes in any suitable manner, including, but not limited to, determining (e.g., detecting, receiving, inferring, deriving, or otherwise obtaining a new metadata asset associated with a moment node by cross-referencing the new metadata asset with other assets in network 107*n* and/or generating a node for each metadata asset of library 105. System 1 may be configured to refine one, some, or each metadata asset associated with a moment nodes in any suitable manner, such as based on a probability distribution (e.g., a discrete probability distribution, a continuous probability distribution, etc.). For example, a Gaussian distribution may be used to determine a distribution of at least some metadata assets, such as the primary primitive metadata assets. For this example, the distribution may be used to ascertain a mean, a median, a mode, a standard deviation, a variance, and/or any other suitable characteristic associated with the distribution of the primary primitive metadata assets. System 1 may be configured to use the Gaussian distribution to select or filter out a subset of the primary primitive metadata assets that may be within any suitable predetermined criterion (e.g., 1 standard deviation (e.g., 68%), 2 standard deviations (e.g., 95%), 3 standard deviations (e.g., 99.7%), etc.). Hence, such selection/filtering operation(s) may be operative to assist with identifying relevant primary primitive metadata assets for MCP management and/or with filtering out noise and/or unreliable primary primitive metadata assets. Consequently, other types of metadata (e.g., inferred metadata assets, etc.) that may be associated with, determined from, or inferred from the primary primitive metadata assets may also be relevant and relatively noise-free. As another example, a Gaussian distribution may be used to determine a distribution of one, some, or each moment nodes. For this example, the distribution may be used to ascertain a mean, a median, a mode, a standard deviation, a variance, and/or any other suitable characteristic associated with the distribution of the moments. System 1 may be operative to use the Gaussian distribution to select or filter out a subset of the moment nodes that may be within any suitable predetermined criterion (e.g., 1 standard deviation (e.g., 68%), 2 standard deviations (e.g., 95%), 3 standard deviations (e.g., 99.7%), etc.). Hence, such selection/filtering operation(s) may be operative to assist with identifying relevant moment nodes for MCP management and/or with filtering out noise and/or unreliable primary inferred metadata assets or otherwise. Consequently, other types of metadata (e.g., primary primitive metadata assets, auxiliary inferred metadata assets, etc.) that may be associated with, determined from, or extracted from the moment metadata assets may also be relevant and relatively noise-free. Noise may occur due to primary primitive metadata assets that may be associated with one or more irrelevant MCIs, where such MCIs may be determined based on the number of MCIs associated with a primary primitive metadata asset. For example, a primary primitive metadata asset associated with two or less MCIs may be designated as noise. This may be because such metadata assets (and their associated MCIs) may be irrelevant given the little information they provide. For example, the more important or significant an event is to a user, the higher the likelihood that the event is captured using a large number of MCIs (e.g., three or more, etc.). For this example, the probability distribution described above may enable selecting the primary primitive metadata asset associated with these MCIs. This may be because the number of MCIs associated with the event may suggest an importance or relevance of the primary primitive metadata asset. In contrast, insignificant events may have only one or two MCIs captured, and the corresponding primary primitive metadata asset may not add much to MCP management based on the use of a metadata network, for example. The immediately preceding examples may also be applicable to any types of metadata.

System 1 may be configured to determine a correlation weight (e.g., confidence weight and/or a relevance weight) for one, some, or each metadata asset and/or one, some, or each correlation between any two metadata nodes representative of any two metadata assets. As used herein, a "confidence weight" and its variations may refer to a value (e.g., an integer, etc.) that may be used to describe a certainty that a metadata asset correctly identifies a feature or characteristic of one or more MCIs (e.g., one or more MCIs associated with a moment). For example, a confidence weight of 0.6 (e.g., out of a maximum of 1.0) can be used to indicate a 60% confidence level that a feature (e.g., a scene) in one or more MCIs associated with a moment is a dog. As used herein, a "relevance weight" and its variations may refer to a value (e.g., an integer, etc.) that may be used to describe an importance assigned to a feature or characteristic of one or more MCIs (e.g., one or more MCIs associated with a moment) as identified by a metadata asset. For example, a first relevance weight of 0.85 (e.g., out of a maximum of 1.0) can be used to indicate that a first identified feature in an MCI (e.g., a person) is very important while a second relevance weight of 0.50 (e.g., out of a maximum of 1.0) can be used to indicate that a second identified feature in an MCI (e.g., a dog) is not as important.

As shown in FIG. 4, for example, system 1 may be operative to estimate that one or more metadata assets associated with one or more MCIs associated with moment node 402 describe a dog. For this example, a correlation weight of a correlation 435 between node 402 and node 436 may be assigned a value 0.8, which may be any suitable confidence weight, any suitable relevance weight, or any suitable combination of any suitable confidence weight and any suitable relevance weight (e.g., a confidence weight ("C-weight") may be determined to be a value of 0.9 to indicate a 90% confidence level that a scene dog metadata asset of scene dog metadata asset node 436 is or ought to be associated with moment node 402 (e.g., with one or more MCIs associated with the first moment represented by moment node 402) and a relevance weight ("R-weight") may be determined to be a value of 0.7 to indicate that a scene dog metadata asset of scene dog metadata asset node 436 is a relatively important feature of moment node 402 (e.g., of one or more MCIs associated with the first moment represented by moment node 402), such that a correlation weight ("weight") may be an average value of 0.8 (alternatively, a correlation weight may be based on a difference between a confidence weight and a relevance weight for a particular edge)). With specific regard to scene metadata assets and/or person identity metadata assets associated with any suitable image MCIs, correlation weights and/or confidence weights and/or relevance weights may be detected via any suitable feature detection techniques that may include analyzing such metadata associated with one or more MCIs. For example, system 1 may be configured to determine any suitable weight(s) using metadata associated with one or more MCIs by applying known feature detection techniques. Relevance can be statically defined in a metadata network from external constraints. For example, relevance can be based on information (e.g., contextual information) that may be acquired from any suitable sources, such as social network data, calendar data, and/or the like. Additionally or alternatively, relevance may be based on any suitable internal constraints, where, for example, as more detections of a metadata asset are made, its relevance can be increased. Relevance may also retard as fewer detections are made. For example, as more detections of the second identified person metadata associated with person metadata node 428 (e.g., Jane Doe) are made over a predetermined period of time (e.g., an hour, a day, a week, a year, etc.), that person's relevance may be increased to indicate that person's importance (e.g., to a user of system 1 (e.g., to John Doe)). Confidence can be dynamically generated based on the ingest of any suitable metadata in a metadata network. For instance, a detected person in an MCI may be linked with information (e.g., contextual information) about that person as may be obtained from a contacts application, a calendar application, a social networking application, and/or any other suitable source to determine a level of confidence that the detected person is correctly identified. For a further example, an overall description of a scene in an MCI may be linked with geo-position information that may be acquired from metadata associated with the MCI to determine the level of confidence. Many other examples are possible. In addition, confidence can be based on any suitable internal constraints, where, for example, as more detections of a metadata asset are made, its identification confidence may be increased. Confidence can also retard as fewer detections are made.

Figure 5:
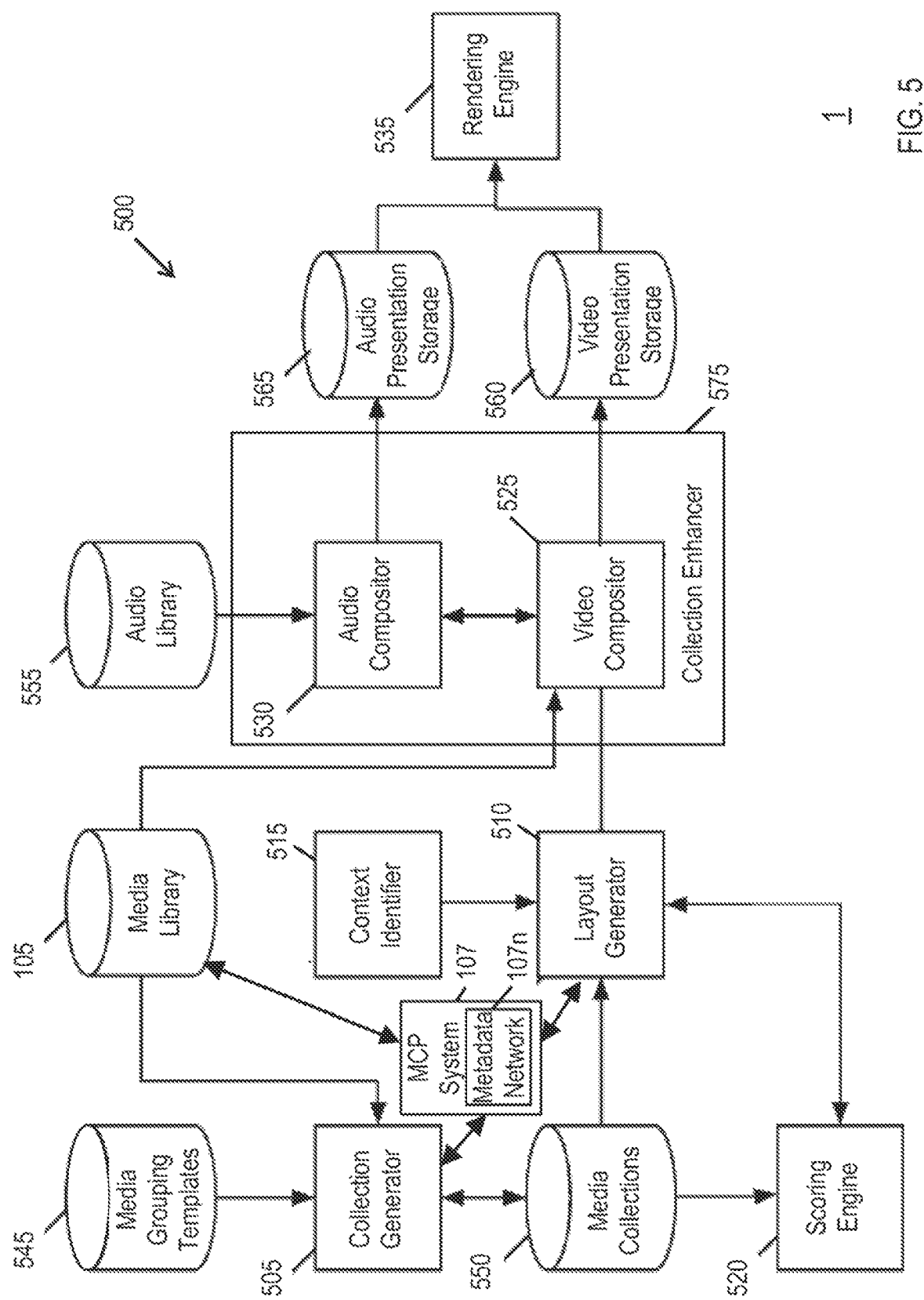
FIG. 5 is a schematic view of an illustrative portion of the system of FIGS. 1-4.
Figure 6:
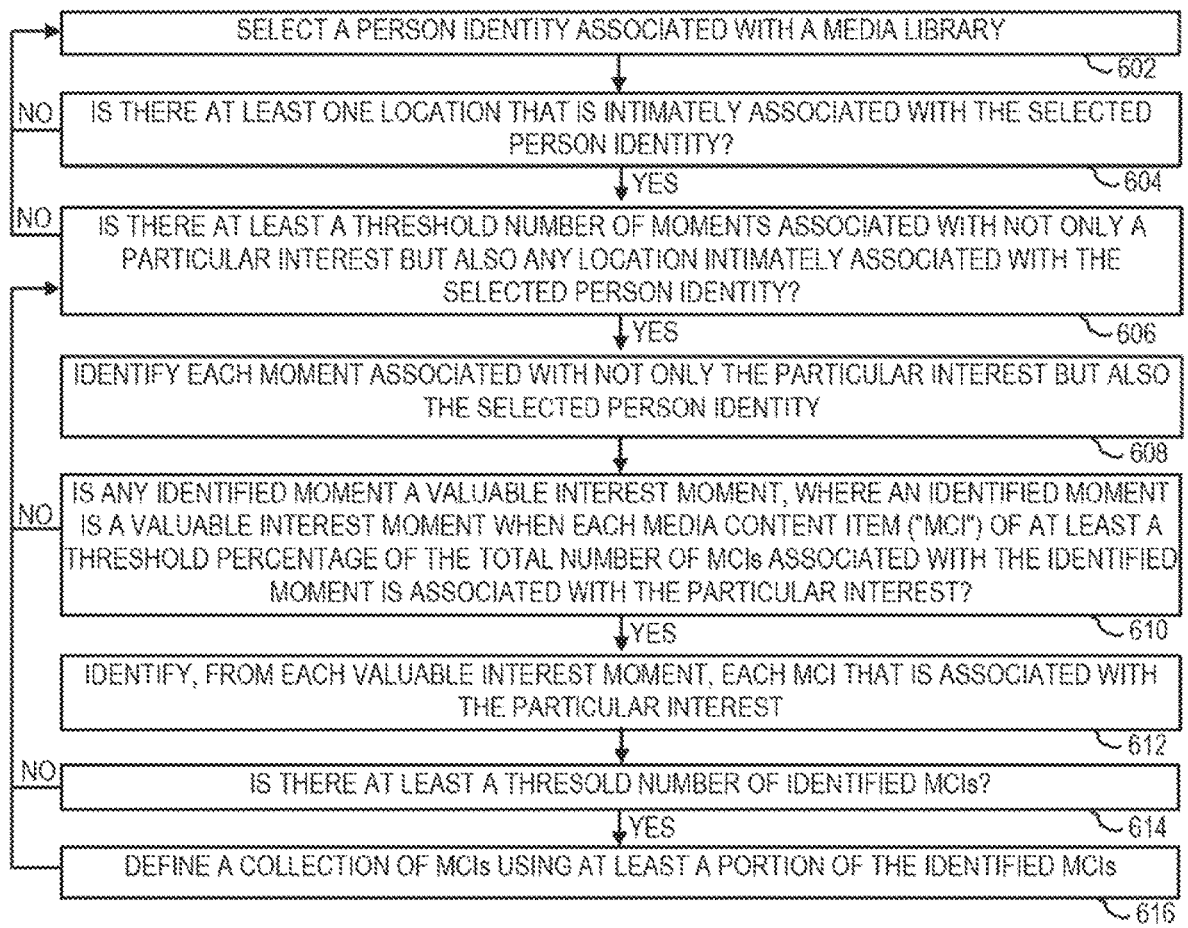

FIG. 6 is a flowchart of an illustrative process 600 for operating system 1 (e.g., a process that may be performed by media management system 500 of FIG. 5) for defining a collection of media content items of a media library for a relevant interest (e.g., for identifying a subset of MCIs of a media library, where each MCI of the subset is associated with an interest (e.g., hobby or avocation or concernment) that has been determined to be of some relevance). Process 600 may use any suitable metadata (e.g., any suitable metadata network and/or any suitable contextual data) that may be associated with the media library in any suitable manner in order to define a collection of media content items for any suitable interest. Process 600 may include (i) identifying a person identity associated with the media library (e.g., using any suitable identity metadata for a particular identity (e.g., a verified or unverified identity) or the like), (ii) identifying a location intimately associated with the person identity (e.g., a home or office or any other suitable type of location frequently associated with the person identity (e.g., using any suitable location metadata and/or correlation information for a particular location with respect to the person identity or the like)), (iii) identifying an interest that is associated in a particular manner with the identified location (e.g., an interest that is associated with at least 3 moments that are associated with the identified location (e.g., using any suitable interest metadata (e.g., scene data) and/or correlation information for a particular interest (e.g., an activity, an animal, an instrument, a baby, etc.) with respect to the identified location or the like)), and (iv) identifying each MCI of the media library that is associated with the person identity and with the interest (e.g., identifying each moment that may be associated with both the person identity and the interest, and then identifying from the MCIs associated with such moments, each MCI associated with the hobby). Then a collection may be defined to include those identified MCIs, and the collection may be used in any suitable manner, such as to provide an album or a composite presentation based on at least some of the MCIs of the defined collection. A majority or the entirety of process 600 may be carried out without any user interaction (e.g., transparent to a user of system 1), which, for example, may reduce the cognitive burden on a user and/or avoid any tedious classification of media by a user, thereby creating a more efficient human-machine interface.

At operation 602 of process 600, one or more processors of the system may select a person identity associated with a media library. For example, any suitable person identity associated with media library 105 may be selected, such as the first verified identity John Doe that may be indicated by person identity metadata that may be represented by person identity metadata asset node 426 of metadata network 107n or the first unverified unknown identity that may be indicated by person identity metadata that may be represented by person identity metadata asset node 430 of metadata network 107n, where the person identity may be selected in any suitable manner, such as automatically by system 1 based on any suitable information (e.g., based on the prominence of the identity with respect to media library 105 (e.g., by analyzing the metadata associated with media library 105)) or through user-selection (e.g., a user may select (e.g., via any suitable system user interface ("UI") (e.g., I/O component 109a)) any suitable person identity associated with media library 105).

At operation 604 of process 600, one or more processors of the system may determine if there is at least one location intimately associated with the selected person identity and, if so, process 600 may advance to operation 606 of process 600, otherwise, process 600 may return to operation 602 where a different person identity may be selected. A determination of operation 604 as to whether one or more locations may be intimately associated with the person identity selected at operation 602 may be made in any suitable manner, such as through processing any suitable metadata associated with media library 105 (e.g., any explicit and/or inferred metadata and/or contextual data). For example, as shown in FIG. 4, analysis of metadata network 107n may be operative to determine at operation 604 that, when the first person identity represented by person identity metadata asset node 426 of metadata network 107n is selected at operation 602, person identity metadata asset node 426 may be intimately associated with location home metadata asset node 434 that may be defined to represent location home metadata indicative of a first home or residence, and location address metadata asset node 408 may be correlated (e.g., by home) with location home metadata asset node 434. An intimate association between a location and a person identity may be indicative of the person identity living at the location (e.g., place of residence (e.g., primary residence or secondary residence (e.g., summer home)) and/or may be indicative of the person identity working at the location (e.g., place of business) and/or may be indicative of the person identity having any other suitable strong relationship to the location (e.g., the location may be the home of the person identity's parent or child). Two or more intimate locations may be identified at operation 604 with respect to a selected person identity (e.g., a primary residence and a summer residence). Alternatively, in some embodiments, only determination of a primary residence of the selected person identity may be operative to satisfy operation 604.

At operation 606 of process 600, one or more processors of the system may determine if there is at least a threshold number of moments associated with both an interest and any location intimately associated with the selected person identity and, if so, process 600 may advance to operation 608 of process 600, otherwise, process 600 may return to operation 602 where a different person identity may be selected. A determination of operation 606 as to whether at least a threshold number of moments may be associated with not only a particular interest but also any location identified at operation 604 may be made in any suitable manner, such as through processing any suitable metadata associated with media library 105. For example, as shown in FIG. 4, analysis of metadata network 107n may be operative to determine at operation 606 that, when the first person identity represented by person identity metadata asset node 426 of metadata network 107n is selected at operation 602 and at least the location address represented by location address metadata asset node 408 is determined at operation 604 to be intimately associated with that selected person identity (e.g., via location home metadata asset node 434), at least the first moment represented by first moment metadata asset node 402 may be not only correlated (e.g., by location) with location address metadata asset node 408 but also correlated (e.g., by presence) with scene metadata asset node 436 that may be representative of a first interest (e.g., first scene (e.g., a dog)). If the threshold number of moments of operation 606 is defined to be the number 1, then this correlation of moment node 402 with both location address node 408 and interest scene dog node 436 may be enough to satisfy operation 606. However, if the threshold number of moments of operation 606 is defined to be the number 2, then at least one other moment (i.e., a moment different than the first moment of moment node 402) would have to be identified at operation 606 as being associated with not only interest scene dog node 436 but also with any location identified at operation 604 (e.g., the same location of address node 408 associated with interest scene dog node 436 and the first moment, or any other location identified at operation 604 (e.g., if operation 604 identified two or more locations intimately associated with the selected person identity (e.g., a primary residence and a summer home))) in order to satisfy operation 606. That is, in order to satisfy the condition of operation 606, at least a threshold number of moments of media library 105 must be identified, where each of those moment must be associated with the same particular interest, and where each of those moment must be associated with any location identified at operation 604 (e.g., a first of the identified moments may be associated with interest I and location X, while a second of the identified moments may be associated with interest I and location Y, and while a third of the identified moments may be associated with interest I and location Z, as long as each one of locations X, Y, and Z were identified at operation 604 as being intimately associated with the person identity selected at operation 602).

The threshold number of moments of operation 606 may be defined as any suitable number in any suitable manner. For example, the threshold number of moments of operation 606 may be the number 1, the number 2, the number 3, the number 4, or the number 5. Alternatively, the threshold number of moments of operation 606 may be a percentage of the total number of moments of the media library that may be associated with the particular interest (e.g., the first scene (e.g., a dog) of scene node 436), a percentage of the total number of moments of the media library that may be associated with any location identified at operation 604, a percentage of the total number of moments of the media library, and/or the like, where the percentage may be any suitable number, such as 5%, 10%, 20%, 30%, 40%, 50%, or the like. Alternatively or additionally, the threshold number may be determined using any suitable calculation based on the distribution of the MCIs (e.g., using standard deviation). Therefore, operation 606 may be satisfied if a particular interest is determined to be associated with at least a particular number of moments also associated with a location that is intimately associated with a particular person identity, such that operation 606 may only be satisfied for an interest that is associated with three different time ranges at a particular person identity's intimate location(s), thereby providing process 600 with enough confidence to handle the interest as a relevant interest for that person identity.

The particular interest of operation 606 may be any suitable type of interest, including one or more particular types of entities that may be represented by any suitable scene metadata assets and, thus any suitable scene metadata asset nodes (e.g., node 436 of network 107n), or by any other suitable type of metadata of media library 105, where the type of interest may include, but is not limited to, any suitable hobby, pet (e.g., dog (generally or a specific breed (e.g., German Shepherd, Retriever, Spaniel, etc.)), cat, bird, etc.), instrument (e.g., generally or piano, guitar, violin, etc.), activity (e.g., generally or cooking, painting, video games, jacuzzi, basketball, boxing, juggling, magic, dancing, billiards, etc.), baby (e.g., a person object that may typically not be associated with a particular identity (e.g., verified or unverified)), and/or the like, where, as mentioned, scene metadata may be indicative of an overall description of an activity or situation associated with one or more MCIs based on any objects that may be detected therein (e.g., if a MCI includes a group of images, then scene metadata for the group of images may be determined using detected objects in one or more of the images (e.g., the detection of a large cake with candles and/or balloons in at least two images in the group can be used to associate "birthday" scene metadata with each of the images)), where such objects or scene indicators or content indicators may be any suitable objects (e.g., a detected animal, a detected company logo, a detected piece of furniture, a detected instrument, etc.) that may be able to be detected in a media content item using any suitable techniques (e.g., any suitable image processing techniques), which may be metadata 350 of media library 105 and/or any suitable node(s) of network 107n. The particular interest of operation 606 may be of any suitable granularity, such as an "animal" or an "animal mammal" or an "animal mammal canine" or an "animal mammal canine dog" or an "animal mammal canine dog shepherd" or an "animal mammal canine dog shepherd german" or the like, but the same level of granularity may be used for each one of the threshold number moments to satisfy operation 606. Operation 606 may be configured to satisfy the condition of operation 606 by first analyzing a first particular interest with respect to the location(s) of operation 604, where the first particular interest may be the most prevalent interest of media library 105, and if that analysis does not satisfy operation 606, then the next most prevalent interest may be analyzed, and so on until an interest is identified that satisfies operation 606 for the location(s) of operation 604 such that process 600 may advance to operation 608, otherwise process 600 may return to operation 602 and select a different person identity. In some embodiments, a particular interest to be used at operation 606 may be selected in any suitable manner (e.g., via any suitable UI) by a user or in response to any suitable action (e.g., a user tagging a "dog" in one or more MCIs (e.g., any suitable explicit user metadata 330)) or in any other suitable manner.

At operation 608 of process 600, one or more processors of the system may identify each moment of library 105 that may be associated with not only a particular person identity (e.g., the person identity selected at operation 602) but also a particular interest (e.g., the particular interest satisfying operation 606 (e.g., with respect to any location(s) intimately associated with the person identity)). Therefore, in some embodiments, operation 608 may identify not only each one of the moments used to satisfy operation 606 (e.g., at least a threshold number of moments associated not only with the particular interest but also any location intimately associated with the selected person identity) but also any other moments that may be associated with the particular interest and with the selected person identity but that may not necessarily be associated with a location intimately associated with the selected person identity. The identification of moments of operation 608 may be made in any suitable manner, such as through processing any suitable metadata associated with media library 105. For example, as shown in FIG. 4, analysis of metadata network 107n may be operative to identify at operation 608 that, when the first person identity represented by person identity metadata asset node 426 of metadata network 107*n* is selected at operation 602 and when the particular interest satisfying operation 606 is the first scene (e.g., a dog) represented by scene metadata asset node 436 of metadata network 107*n*, at least each one of the first moment represented by first moment metadata asset node 402 and the second moment represented by second moment metadata asset node 404 may be associated (e.g., by presence) not only with person identity metadata asset node 426 of the selected person identity but also with scene metadata asset node 436 of the particular interest.

At operation 610 of process 600, one or more processors of the system may determine whether any identified moment (e.g., any moment identified at operation 608) is a valuable interest moment, where an identified moment is a valuable interest moment when each MCI of at least a threshold percentage of the MCIs associated with the identified moment is associated with the particular interest, and, if so, process 600 may advance to operation 612 of process 600, otherwise, process 600 may return to operation 606 where a different particular interest may be identified to attempt to satisfy the condition of operation 606 (or may return from operation 606 to operation 602 if such a different particular interest is not available). A determination of operation 610 as to whether a moment identified at operation 608 is a valuable interest moment may be made in any suitable manner, such as through processing any suitable metadata associated with media library 105. For example, operation 610 may be operative to analyze metadata associated with particular MCIs of an identified moment to determine how many MCIs of the identified moment are directly associated (e.g., not only via the identified moment) with metadata indicative of the particular interest and then determine whether that number of MCIs is at least a threshold percentage of the total number of MCIs of the identified moment. As mentioned, each MCI of a moment may be directly associated with time metadata indicative of a time within a time range of the moment and directly associated with location metadata indicative of a location within a location range of the moment, such that the MCI may be associated with the moment. Moreover, when a non-moment node may be associated with a moment node, the non-moment node may be representative of metadata that may be directly associated with only one or some (and, in some situations, all) of the MCIs associated with the moment. For example, in some embodiments, while scene metadata asset node 436 representative of scene metadata indicative of the particular interest (e.g., the first scene (e.g., a dog)) may be correlated with moment node 402, which may be associated with each MCI that has time and location metadata related to the time and location constraints of the moment, only one or some but not all of those MCIs may be associated with scene metadata indicative of the particular interest (e.g., the first scene (e.g., a dog)) represented by scene metadata asset node 436 (e.g., only 6 MCIs out of the 10 total MCIs that may be associated with moment node 402 may be associated with scene metadata indicative of the particular interest (e.g., only 60% of the MCIs associated with the first moment may also be associated with the particular interest (e.g., each MCI 310 of only 60% of the MCIs 310 associated with the first moment may be of an MCP 305 with metadata 311 indicative of the particular interest (e.g., each MCI 310 of only 60% of the MCIs 310 associated with the first moment may be detected to include pixel data indicative of a dog)))). None, one, some, or each of the moments identified at operation 608 may be determined to be a valuable interest moment at operation 610.

The threshold percentage of operation 610 may be defined as any suitable number in any suitable manner. For example, the threshold percentage of MCIs of operation 610 may be 30%, 40%, 50%, 60%, 70%, 80%, or the like. Alternatively, the threshold percentage of operation 610 may vary based on the number of moments identified at operation 608 (e.g., the threshold percentage may be greater when more moments are identified, and may be smaller when less moments are identified, or vice versa). Alternatively, the threshold percentage may not be a percentage but may instead be a number, such as 5, or 10, or 20, or the like. In one particular embodiment, the threshold percentage of operation 610 may be 60%, while the threshold number of operation 606 may or may not be 3. Alternatively or additionally, rather than a threshold percentage, any suitable threshold number may be used at operation 610 as may be determined using any suitable calculation based on the distribution of the MCIs (e.g., using standard deviation). Therefore, operation 610 may be satisfied if at least one moment identified at operation 608 is associated with a number of MCIs of which at least a particular threshold percentage are associated with the particular interest (e.g., each MCI of at least 60% of the MCIs of an identified moment must be associated with the particular interest in order for that identified moment to be considered a valuable interest moment), thereby providing process 600 with enough confidence in the relevancy of that moment with respect to the particular interest. In some embodiments, operation 610 may also provide one or more additional conditions on whether an identified moment may be determined to be a valuable interest moment. For example, in addition to determining that an identified moment may be a valuable interest moment when each MCI of at least a threshold percentage of the MCIs associated with the identified moment is associated with the particular interest, operation 610 may also be configured to determine whether each MCI of at least another threshold percentage of the MCIs associated with the identified moment is associated with the selected person identity. As just one example, an identified moment may only be determined by operation 610 to be a valuable interest moment if not only at least X % of the moment's MCIs are associated with the particular interest but also at least Y % of the moment's MCIs are associated with the selected person identity (e.g., where Y % may be any suitable percentage greater than or less than X % (e.g., 60%)). As just one other example, an identified moment may only be determined by operation 610 to be a valuable interest moment if not only at least X % of the moment's MCIs are associated with the particular interest but also at least Y % of those MCIs of the X % are associated with the selected person identity (e.g., where Y % of X % of the MCIs of the identified moment must be associated with not only the particular interest but also the selected person identity).

At operation 612 of process 600, one or more processors of the system may identify, from each valuable interest moment, each MCI that is associated with the particular interest (e.g., each MCI of at least the threshold percentage of the total number of MCIs of each valuable interest moment as associated with the particular interest). Therefore, operation 612 may be operative to identify all MCIs associated with the particular interest that may also be MCIs associated with a valuable interest moment that has been determined to be a relevant moment with respect to the particular interest.

At operation 614 of process 600, one or more processors of the system may determine if there is at least a threshold number of identified MCIs (e.g., if the number of MCIs identified at operation 612 is at least a threshold number) and, if so, process 600 may advance to operation 616 of process 600, otherwise, process 600 may return to operation 606 where a different particular interest may be identified to attempt to satisfy the condition of operation 606 (or may return from operation 606 to operation 602 if such a different particular interest is not available). The threshold number of identified MCIs of operation 614 may be defined as any suitable number in any suitable manner. For example, the threshold number of identified MCIs of operation 616 may be 5, 10, 20, 30, or the like. In some embodiments, the determination of operation 616 may be done for multiple ranges of time, such as is there at least a threshold number of identified MCIs for a first period of time (e.g., the year 2015 (e.g., is there at least a threshold number of the identified MCIs associated with metadata indicative of the year 2015)) and is there a threshold number of identified MCIs for a second period of time (e.g., the year 2016), and if not, then a determination may be made to determine if there is at least a threshold number of identified MCIs for a different period of time (e.g., the years 2015 and 2016 combined). Therefore, operation 616 may be satisfied if at least a particular number of identified MCIs are determined for at least one suitable period of time (e.g., a month, a year, two years, or the entire time span of library 105, etc.), such that operation 616 may only be satisfied for a particular interest that is associated with at least a particular number of MCIs, where each MCI is also associated with a moment with at least a particular amount of relevancy with respect to the particular interest.

At operation 616 of process 600, one or more processors of the system may define a collection of MCIs using at least a portion of the identified MCIs (e.g., a collection of MCIs that may include at least some of the MCIs identified at operation 612). In some embodiments, a single collection may be defined at operation 616 that may include some or most or all of the MCIs identified at operation 612. Alternatively, if operation 614 may determine that a first set of at least the threshold number of identified MCIs are associated with a first time frame and that a second set of at least the threshold number of identified MCIs are associated with a second time frame, then operation 616 may define a first MCI collection that includes at least a portion or most or all of the first set of identified MCIs and may also define a second MCI collection that includes at least a portion or most or all of the second set of identified MCIs. Any MCI collection of MCIs defined at operation 616 may then be used in any suitable manner (e.g., for presentation to a user as an album of MCIs or as a composite presentation based on the MCIs of the collection), where the collection of MCIs may be indicative of MCIs associated with an interest of some relevancy. In some embodiments, the collection may be named or otherwise associated with textual information indicative of the selected person identity and the particular interest that resulted in the collection being defined, such as "John Doe's Dog" when the selected person identity was the first person identity of node 426 and the particular interest was the scene dog of node 436.

It is understood that the operations shown in process 600 of FIG. 6 are only illustrative and that existing operations may be modified or omitted, additional operations may be added, and the order of certain operations may be altered. In some embodiments, a particular interest may be associated with one or more elements that may be considered too similar to the particular interest in one or more ways such that each element may be considered a blacklist element for the particular interest, wherein a moment and/or MCI associated with both the particular interest and a blacklist element for the particular interest may be ignored with respect to one or more operations of process 600. For example, continuing with the example of a particular interest being a "dog" (e.g., the scene dog of node 436), a blacklist element for a dog may be a "baby," as a baby may be often falsely detected as a dog and/or a dog may be often falsely detected as a baby (e.g., due to one or more shortcomings in image processing and/or object recognition technology). In such an embodiment, operation 606 may be operative to determine whether or not there is at least a threshold number of moments that is not only (i) associated with the particular interest but also (ii) associated with any location intimately associated with the selected person identity and also (iii) not associated with any blacklist element of the particular interest. Additionally or alternatively, in such an embodiment, operation 608 may be operative to identify each moment that is not only (i) associated with the particular interest but also (ii) associated with the selected person identity and also (iii) not associated with any blacklist element of the particular interest. Additionally or alternatively, in such an embodiment, operation 610 may be operative to determine that an identified moment is a valuable interest moment when each MCI of at least a threshold percentage of the total number of MCIs associated with the identified moment is not only (i) associated with the particular interest but also (ii) not associated with any blacklist element of the particular interest. Additionally or alternatively, in such an embodiment, operation 612 may be operative to identify, from each valuable interest moment, each MCI that is not only (i) associated with the particular interest but also (ii) not associated with any blacklist element of the particular interest. Such handling of one, some, each, or any blacklist elements of a particular interest may be operative to increase confidence in the MCIs that may be identified for defining a collection of MCIs for the particular interest.

Operation 604 may be omitted in some embodiments of process 600, whereby process 600 may advance from operation 602 to operation 606 when operation 602 is satisfied. In such embodiments, operation 606 may be operative to determine whether or not there is at least a threshold number of moments that is not only (i) associated with the particular interest but also (ii) associated with the selected person identity (e.g., generally associated with the selected person identity without any condition with respect to any location (e.g., a location that may be intimately associated with the selected person identity)) and, in some embodiments, also (iii) not associated with any blacklist element of the particular interest.

Operations 604 and 606 may be omitted in some embodiments of process 600, whereby process 600 may advance from operation 602 to operation 608 when operation 602 is satisfied. In such embodiments, operation 608 may be operative to identify each moment that is not only (i) associated with the particular interest but also (ii) associated with the selected person identity (e.g., generally associated with the selected person identity without any condition with respect to any location (e.g., a location that may be intimately associated with the selected person identity) or with respect to any threshold number of such moments) and, in some embodiments, also (iii) not associated with any blacklist element of the particular interest.

Operation 608 may be omitted in some embodiments of process 600, whereby process 600 may advance from operation 606 to operation 610 when operation 606 is satisfied. Additionally, in some embodiments, operations 606 and 608 may be omitted in some embodiments of process 600, whereby process 600 may advance from operation 604 to operation 610 when operation 604 is satisfied. In either of such embodiments, operation 610 may be operative to determine whether a moment that may be associated with the particular interest and any location intimately associated with the selected person identity is a valuable interest moment when each MCI of at least a threshold percentage of the total number of MCIs associated with the moment is (i) associated with the particular interest and, in some embodiments, also (iii) not associated with any blacklist element of the particular interest. In such embodiments, operation 610 may be operative to use each moment that may be associated with the particular interest and any location intimately associated with the selected person identity as an identified moment for the purposes of defining a valuable interest moment at operation 610, such that any valuable interest moment identified at operation 610 would be associated with the particular interest and any location intimately associated with the selected person identity (e.g., as opposed to a moment that might not be associated with such a location intimately associated with the selected person identity). Alternatively, in some embodiments, operation 608 may be included in process 600 but operation 610 may be operative to also define each moment that may be associated with the particular interest and any location intimately associated with the selected person identity as a valuable interest moment, such that operation 612 may be operative to identify each MCI associated with the particular interest from each moment that is associated with the particular interest and with any location intimately associated with the selected person identity.

In some embodiments, any suitable operation(s) of process 600 may be operative to define any suitable "person identity interest" metadata that may be associated with one or more MCIs and/or one or more moments and/or one or more nodes of network 107n. For example, each MCI identified at operation 612 or each MCI used to define a collection at operation 616 may be associated with "person identity interest" metadata that may be indicative of the particular interest determined to be relevant to the selected person identity may be associated with that MCI. A "person identity interest" node associated with such "person identity interest" metadata may be added to metadata network 107n and may be correlated to the person identity node for the selected person identity (e.g., to person identity node 426) and/or may be correlated to the particular interest node for the particular interest (e.g., to scene dog node 436) and/or may be correlated to each moment node associated with each one of the person identity and particular interest (e.g., moment nodes 402 and 404) and/or associated with each MCI identified at operation 612 and/or operation 616, and/or the like. Such "person identity interest" metadata and/or node may be used to enable faster MCI collection definition of a large media library and/or may be operative to enable presentation of such identified person identity interests (e.g., in any suitable UI to a user, which may enable the user to request a collection of MCIs associated with a selected person identity interest).

System 1 may be operative to manage a media library in order to define a collection of media content items of a media library for a relevant interest, where such a collection of MCIs may be presented to a user in any suitable manner. For example, as shown in FIG. 5, system 1 may include a media management system 500 that may be provided to manage media of media library 105 of system 1, such as, for example, to (i) generate metadata network 107n, (ii) relate and/or present at least two MCIs 310 based on metadata network 107n, (iii) determine and/or present interesting MCIs 310 of library 105 based on metadata network 107n and predetermined criterion, (iv) select and/or present representative MCIs 310 to summarize a collection (e.g., a moment) of media content items based on input specifying the representative group's size, and/or (v) use metadata network 107n and/or any other data associated with library 105 to define a collection of media content items of a media library for a relevant interest. Media management system 500 may include any suitable modules, including, but not limited to, MCP management system 107, which may include metadata network 107n, a collection generator 505, a layout generator 510, a context identifier 515, a scoring engine 520, a media compositor or collection enhancer 575, which may include a video compositor 525 and/or an audio compositor 530, and a rendering engine 535. As shown, media management system 500 may have access to media library 105 of MCPs 305, metadata network 107n of MCP management system 107, media grouping templates 545, media collections 550, an audio library 555, a video presentation storage 560, and/or an audio presentation storage 565.

Media management system 500 may be operative to provide a media-compositing application (e.g., an application 103) that may automatically organize MCIs 310 of library 105 into different MCI collections and/or may enable a user to define MCI collections in any suitable manner, and that may then produce any suitable user interface ("UI") layout that may identify the defined MCI collections as collections that may be viewed by a user (e.g., as individual MCIs of a selected collection) or for which the application may display composite presentations (e.g., video (e.g., audio/visual) presentations for a selected collection). Media management system 500 may enable such a media-compositing application that may be executed by system 1. Collection generator 505 and layout generator 510 may be operative to perform an automated process that may (i) analyze the MCIs (e.g., analyzes the MCIs and any associated metadata of library 105, including metadata network 107n and/or any suitable contextual data) to define one or more MCI collections and (ii) produce a UI layout that may identify the defined MCI collections as collections for which the application can display composite presentations. In performing such operations, these modules may use scoring engine 520 and/or context identifier 515. For example, to define the MCI collections, collection generator 505 may use one or more media grouping templates ("templates") of template storage 545 to try to associate each MCI of library 105 with one or more template instances. In some embodiments, a template in template storage 545 may be defined by reference to a set of media matching attributes and collection generator 505 may compare a template's attribute set with the content and/or metadata of the MCIs in order to identify MCIs that may match the template attributes, such that, when a sufficient number of MCIs match the attribute set of a template, the application may define a template instance by reference to the matching MCIs and may store such a template instance in media collection storage 550. In some embodiments, a template instance may include a list of MCI identifiers that identify the MCI's that matched the instance's template attribute set. Collection generator 505 may be operative to define multiple template instances for a template, such as where the templates may include (i) location-bounded templates (e.g., MCIs captured within a region with a particular radius), (ii) time-bounded templates (e.g., MCIs captured within a particular time range and/or date range), (iii) time-bounded and location-bounded templates (e.g., mornings at a beach), (iv) content-defined templates (e.g., MCIs containing a relevant interest (e.g., a dog as described above) or MCIs containing smiles, etc.), and (v) user-metadata based templates (e.g., MCIs from albums created by a user, MCIs shared by a user with others, MCIs having particular user-defined metadata tags, etc.).

Based on template definition, layout generator 510 may generate any suitable UI layouts that may identify one or more defined template instances as MCI collections for which the application can display composite presentations. Layout generator 510 may generate a UI layout that identifies a subset of defined template instances that may be contextually relevant to a user of the device at a particular time (e.g., as based on any suitable contextual attributes that may be provided by context identifier 515 and any template instance scores that may be computed by scoring engine 520 (e.g., to assess whether one template instance is contextually more relevant than, and/or better than, another template instance at a particular time, scoring engine 520 may generate a score for each template instance, rank the template instances based on the generated scores, and then generate a UI layout based on the rankings so that a user may choose a template instance (e.g., MCI collection) for use in presenting a related composite presentation), where a template instance's score may be based on any suitable contextual information, such as (i) contextual attributes that may relate to the time at which the UI layout is being generated and/or displayed, and (ii) quality and/or quantity attributes that may relate to quality and/or quantity of the MCIs of the template instance, where examples of contextual attributes may include (i) time, (ii) location of device 100, (iii) location of future calendared events stored on, or accessible by, device 100, (iv) locations derived from electronic tickets stored on device 100, and/or the like).

When a user selects a particular template instance via any suitable UI, or when system 1 may automatically select a particular template instance in any suitable manner, layout generator 510 may direct collection enhancer 575 to generate media collection enhancement definitions that may be rendered by engine 535 to produce an enhancement (e.g., a composite presentation) for consumption by the user (e.g., via any suitable UI (e.g., I/O component 109a)) For example, layout generator 510 may be operative to direct video compositor 525 and/or audio compositor 530 to generate, for the selected template instance, the definitions of video and audio presentation components (e.g., for storage in storage 560 and/or 565), which rendering engine 535 may then render to produce a composite presentation for display. Collection enhancer 575 may generate the definition of the composite media presentation from the MCIs of the selected template instance. In some embodiments, a composition presentation may be generated for each template instance prior to selection of a particular template instance.

In some embodiments, the definition of a composite media presentation may include the identity of the MCIs of the collection that are to be included in the presentation, the presentation order for the included MCIs, andlor a list of any suitable edit operations (e.g., transition operations, special effects, etc.) that may be performed to generate the composite presentations from the MCIs. In some embodiments, the MCIs of the composite media presentation can be identical to the MCIs of the template instance, or they can be MCIs that the media compositor may derive from the instance's MCIs. For example, multiple MCIs of a template instance can be still photos, where, for some or all of these still photos, collection enhancer 575 (e.g., video compositor 525) may generate a video clip in the composite generation by specifying a particular type of effect (e.g., a "Ken Burns" effect) for each of these photos. Also, from a video clip MCI of a template instance, the application can extract one or more video clips to include in the composite presentation. Similarly, from an MCI that is a burst-mode sequence, collection enhancer 575 may be operative to extract one or more still photos of the sequence and/or one or more types of video clips for one or more of the still photos of the sequence. Many other examples of deriving the composite-presentation with MCIs from a template instance's MCIs exist.

Collection enhancer 575 may be operative to generate composite media definitions by selecting a blueprint from a number of possible blueprints for the composite presentation. A blueprint may describe the desired transitions, effects, edit styles (e.g., including pace of the edits), and/or the like for a composite presentation. A blueprint can also specify the desired type of presentation, which can then influence the type of MCIs included or emphasized in the composite presentation. For example, one blueprint might specify highlights as the desired type of presentation, while another blueprint might specify retrospective as the desired type. For highlights, collection generator 505 or collection enhancer 575 may select the best MCIs that are representative of the MCIs of the template instance. For retrospectives, collection generator 505 or collection enhancer 575 may select the MCIs that are not necessarily of the whole set of MCIs of the template instance. In some embodiments, a blueprint may determine the duration of the composite presentation that collection enhancer 575 may generate. System 500 may be operative to specify the duration based on the amount of high-quality, unique content in the MCI collection of the template instance. For instance, in some embodiments, a blueprint's specified parameters (e.g., parameters specifying ideal duration for the MCIs) along with the MCIs that are selected may determine the desired duration of the composite presentation. In some embodiments, the blueprint might also specify other suitable parameters.

A type of a relevant particular interest (e.g., a particular interest that may result in a collection of MCIs being defined by process 600) for an MCI collection of the template instance may be used by collection enhancer 575 to determine which blueprint of the available blueprints is to be used for defining the composite presentation. For example, continuing with an example referred to above where a "dog" may be a particular interest that may be identified as relevant so as to be used to define an MCI collection, that particular interest of "dog" may be utilized by system 500 (e.g., by collection enhancer 575) to determine automatically the generation of the composite generation in any suitable way(s) (e.g., to choose a particular type of blueprint (e.g., a blueprint associated with a happy mood or a sentimental mood) for a "dog" particular interest and to choose a different type of blueprint (e.g., a blueprint associated with an extreme mood) for a "skydiving" particular interest.

In some embodiments, collection enhancer 575 may be operative to provide the particular duration of time for the composite presentation to audio compositor 530, after such a duration may have been selected by a user and/or mood and/or keyword and/or blueprint. Based on the received duration, audio compositor 530 may dynamically define a composite audio presentation to accompany the composite media presentation of video compositor 525. Audio compositor 530 may dynamically define an audio presentation to include several audio segments (e.g., of one or more of the MCIs and/or from audio library 555) in a particular sequence, and a set of edits and transitions between the audio segments in the sequence. In some embodiments, the audio segments are part of one song, while in other embodiments, they can be part of two or more songs. These audio segments may be referred to as body segments to signify that they are parts of another song. In some embodiments, audio compositor 530 may also select an ending segment from several candidate ending segments for the composite audio presentation. Audio compositor 530 may select a starting segment from several starting segments for the composite audio presentation. An editor may define a body, starting and ending segments from one or more songs by using any suitable audio authoring tools.

When an MCI collection is associated with a particular relevant interest, that interest may be used by audio compositor 530 to determine an appropriate song or collection of songs to be used to generate at least a portion of an audio portion of composite presentation. In some particular embodiments, a particular blueprint may be selected based on a particular interest associated with the MCI collection, where the particular blueprint may be associated with a number of different possible songs, and a particular one or more of the different possible songs may be selected for the particular blueprint based on the particular interest associated with the MCI collection. Alternatively, no matter how a blueprint may be selected, one or more songs to be used for defining a composite presentation with the selected blueprint may be selected based on one or more valid keywords associated with the MCI collection. The group of available songs from which collection enhancer 575 (e.g., audio compositor 530) may select one or more songs (e.g., from audio library 555) may be any suitable collection of songs, which may be a particular curated list of music for collection enhancer 575 or may be any suitable song from a library of songs available to system 1 (e.g., a user's personal music collection available to system 1). Each song may be associated with any suitable metadata that may be used by collection enhancer 575 in order to select an appropriate one or more songs based on any valid relevant interest associated with the MCI collection. For example, lyric metadata and/or song title metadata and/or artist metadata and/or tempo metadata and/or song style metadata and/or the like may be compared with the interest type to identify one or more songs to use for generating one or more composite presentations for the MCI collection. For example, a relevant interest of "dog" may be operative to enable collection enhancer 575 to identify and select a dog-themed song for use with the composite presentation.

After collection enhancer 575 may generate a definition of the composite presentation (e.g., after video compositor 525 may generate a definition for a video/media presentation, and after audio compositor 530 may generate a definition for an audio (e.g., song) presentation), the generated presentation definition(s) may be stored in storage (e.g., video/media presentation definition(s) in storage 560 and audio (e.g., song) presentation definition(s) in storage 565, although in some embodiments one storage (e.g., one file) may be used for both video and audio definitions). Rendering engine 535 may then retrieve the definition(s) and generate a rendered composite presentation from the definition(s), which may then be output to a frame buffer of the system for presentation. One of ordinary skill will realize that system 500 may operate in any other suitable manner, such as, instead of defining a composite presentation for a template instance after a user selects a particular instance and/or mood and/or duration, system 500 may defines the composite presentation for some or all appropriate MCI collections in advance of receive any user selection. For instance, in some embodiments, the system may identify a subset of composite presentations that should initially be concurrently represented on a UI layout, and to identify an order of summary panes for those composite presentations on the UI layout. Alternatively, some embodiments may render the composite presentations before generating the UI layout, while still other embodiments may define a portion of a composite presentation before the UI layout is generated, and then may generate the rest of the definition of the composite presentation after the UI layout is generated.

In some embodiments, after a user selects a particular MCI collection of a particular template instance, system 500 may direct collection enhancer 575 to generate, for the selected template instance, the definition of the composite presentation. To generate the definition of the media composite presentation, collection enhancer 575 may automatically pick a mood for the composite presentation based on any suitable available data, including one or more identified relevant interests associated with the MCI collection. After picking the mood, collection enhancer 575 may select from a number of different blueprints a particular blueprint for the composite presentation based on the picked mood. The blueprint may describe any suitable characteristics of the presentation to be generated based on the blueprint, including, but not limited to, the desired transitions, effects, edit styles (e.g., including pace of the edits), the desired type of presentation, and/or the like, where one or more of such characteristics may vary between different blueprints. Collection enhancer 575 may select a subset or all of the MCIs of the MCI collection based on the picked mood and/or the selected blueprint for use in generating the composite presentation. Collection enhancer 575 may select a particular duration of time for the composite presentation based on the picked mood and/or the selected blueprint and/or the selected MCIs for use in generating the composite presentation. In conjunction with the selected blueprint, which may specify the type of desired edits (e.g., fast transition edits, or slow transition edits), the selection of the subset of MCIs may allow collection enhancer 575 to automatically define the duration of the composite presentation without any user input. After computing the desired duration of the composite presentation, collection enhancer 575 may provide this duration to audio compositor 530 in order for audio compositor 530 to dynamically generate the definition of a song presentation that has this duration. As mentioned above, audio compositor 530 may be operative to generate this definition by exploring different combinations of body segments from one or more songs available songs, along with different possible starting and ending segments, where one or more songs may be selected from a collection of available songs based on one or more of any relevant particular interest associated with the MCI collection, the mood chosen for the presentation, the blueprint chosen for the presentation, and/or the duration of time chosen for the presentation. Then the video/media/audio presentation definitions may be synched and provided to rendering engine 535 that may generate a rendered composite presentation from these definitions.

FIG. 7 is a flowchart of an illustrative process 700 for analyzing media content of a media library (e.g., with a computing system). At operation 702 of process 700, the computing system may access a plurality of media content items (MCIs) of a media library and metadata associated with the media library, wherein the metadata defines a plurality of moments, each moment of the plurality of moments is associated with a subset of MCIs of the plurality of MCIs, and each MCI of the subset of MCIs that is associated with a particular moment is associated with geographical metadata indicative of a geographic location within a particular geographic range associated with the particular moment and temporal metadata indicative of a time within a particular time range associated with the particular moment. At operation 704 of process 700, the computing system may analyze the plurality of MCIs and the metadata by identifying a plurality of first person residence moments from the plurality of moments, wherein each first person residence moment of the plurality of first person residence moments is a moment of the plurality of moments that is associated with both a first person and a residence of the first person, and by identifying an interest that is associated with each one of a first number of first person residence moments of the plurality of first person residence moments, wherein the first number is greater than a threshold value. At operation 706 of process 700, the computing system may define a collection of MCIs of the plurality of MCIs, wherein each MCI of the collection of MCIs is associated with a moment of the plurality of moments that is associated with both the first person and the interest.

It is understood that the operations shown in process 700 of FIG. 7 are only illustrative and that existing operations may be modified or omitted, additional operations may be added, and the order of certain operations may be altered.

FIG. 8 is a flowchart of an illustrative process 800 for managing a media library with a computing system. At operation 802 of process 800, the computing system may access a plurality of media content items (MCIs) of the media library and metadata associated with the media library, wherein the metadata defines a plurality of moments, each moment of the plurality of moments is associated with a subset of MCIs of the plurality of MCIs, and each MCI of the subset of MCIs that is associated with a particular moment is associated with temporal metadata indicative of a time within a particular time range associated with the particular moment. At operation 804 of process 800, the computing system may analyze the plurality of MCIs and the metadata by identifying at least one person residence moment from the plurality of moments, wherein each person residence moment of the at least one person residence moment is a moment of the plurality of moments that is associated with a location intimately associated with a person identity, and by identifying an interest that is associated with at least one of the at least one person residence moment. At operation 806 of process 800, the computing system may define a collection of MCIs of the plurality of MCIs, wherein each MCI of the collection of MCIs is associated with the identified interest.

It is understood that the operations shown in process 800 of FIG. 8 are only illustrative and that existing operations may be modified or omitted, additional operations may be added, and the order of certain operations may be altered.

FIG. 9 is a flowchart of an illustrative process 900 for managing a media library with a computing system. At operation 902 of process 900, the computing system may access a plurality of media content items (MCIs) of the media library. At operation 904 of process 900, the computing system may identify, with the computing system, at least a threshold number of MCIs of the plurality of MCIs that are associated with both a particular person entity and a particular interest. At operation 906 of process 900, the computing system may define a collection of MCIs of the plurality of MCIs, wherein each MCI of the collection of MCIs is associated with the particular interest.

It is understood that the operations shown in process 900 of FIG. 9 are only illustrative and that existing operations may be modified or omitted, additional operations may be added, and the order of certain operations may be altered.

Moreover, one, some, or all of the processes described with respect to FIGS. 1-9 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via any suitable communications circuitry 106 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of media management system 500 may be provided as a software construct, firmware construct, one or more hardware components, or a combination thereof. For example, any or each module of media management system 500 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of media management system 500 are only illustrative, and that the number, configuration, functionality, and interconnection of existing modules may be modified or omitted, additional modules may be added, and the interconnection of certain modules may be altered.

At least a portion of one or more of the modules of media management system 500 may be stored in or otherwise accessible to device 100 in any suitable manner (e.g., in memory 104 of device 100 (e.g., as at least a portion of application 103)) and/or to server 50. Any or each module of media management system 500 may be implemented using any suitable technologies (e.g., as one or more integrated circuit devices), and different modules may or may not be identical in structure, capabilities, and operation. Any or all of the modules or other components of media management system 500 may be mounted on an expansion card, mounted directly on a system motherboard, or integrated into a system chipset component (e.g., into a "north bridge" chip).

Any or each module of media management system 500 may be a dedicated system implemented using one or more expansion cards adapted for various bus standards. For example, all of the modules may be mounted on different interconnected expansion cards or all of the modules may be mounted on one expansion card. With respect to media management system 500, by way of example only, the modules of media management system 500 may interface with a motherboard or processor 102 of device 100 through an expansion slot (e.g., a peripheral component interconnect ("PCI") slot or a PCI express slot). Alternatively, media management system 500 need not be removable but may include one or more dedicated modules that may include memory (e.g., RAM) dedicated to the utilization of the module. In other embodiments, media management system 500 may be at least partially integrated into device 100. For example, a module of media management system 500 may utilize a portion of device memory 104 of device 100. Any or each module of media management system 500 may include its own processing circuitry and/or memory. Alternatively, any or each module of media management system 500 may share processing circuitry and/or memory with any other module of media management system 500 and/or processor 102 and/or memory 104 of device 100. Alternatively, any or each module of media management system 500 may share processing circuitry and/or memory of server 50 remote from device 100.

As described above, one aspect of the present technology is the gathering and use of data available from various sources to define a collection of media content items of a media library for a relevant interest. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, office addresses, data or records relating to a user's health or level of fitness (e.g., vital signs measurements, medication information, exercise information, etc.), date of birth, or any other identifying or personal information.

The present disclosure recognizes that the use of such personal information data, in the present technology, can be used to the benefit of users. For example, the personal information data can be used to improve the definition of a collection of media content items of a media library for a relevant interest with the electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location detection services, the present technology can be configured to allow users to select to "opt in" or "opt out" of participation in the collection of personal information data during registration for services or anytime thereafter. In addition to providing "opt in" or "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the definition of a collection of media content items of a media library for a relevant interest can be made based on non-personal information data or a bare minimum amount of personal information, such as the content being requested by the device associated with a user, other non-personal information available to the device, or publicly available information.

While there have been described systems, methods, and computer-readable media for defining a collection of media content items of a media library for a relevant interest, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A non-transitory machine readable medium storing a program for execution by at least one processing unit of a device, the program for managing a media library, the program comprising sets of instructions for:
   accessing a plurality of media content items (MCIs) of the media library and metadata associated with the media library, wherein:
      the metadata defines a plurality of moments;
      each moment of the plurality of moments is associated with a subset of MCIs of the plurality of MCIs; and
      each MCI of the subset of MCIs that is associated with a particular moment is associated with:
         geographical metadata indicative of a geographic location within a particular geographic range associated with the particular moment; and
         temporal metadata indicative of a time within a particular time range associated with the particular moment;
   analyzing the plurality of MCIs and the metadata, wherein the analyzing comprises:
      identifying a plurality of first person-residence moments from the plurality of moments, wherein each first person-residence moment of the plurality of first person-residence moments is a moment of the plurality of moments that is associated with both a first person and a residence of the first person; and
      identifying an interest that is associated with each one of a first number of first person-residence moments of the plurality of first person-residence moments, wherein the first number is greater than a threshold value, wherein the threshold value is at least two; and
   defining a collection of MCIs of the plurality of MCIs, wherein each MCI of the collection of MCIs is associated with a moment of the plurality of moments that is associated with both the first person and the interest.

2. The non-transitory machine readable medium of claim 1, wherein:
   each MCI of the collection of MCIs is associated with interest metadata indicative of the interest; and
   each MCI of the collection of MCIs is associated with a first person-residence moment of the first number of first person-residence moments.

3. The non-transitory machine readable medium of claim 2, wherein the threshold value is two.

4. The non-transitory machine readable medium of claim 1, wherein:
   the analyzing further comprises:
      identifying a plurality of first person-interest moments from the plurality of moments, wherein each first person-interest moment of the plurality of first person-interest moments is a moment of the plurality of moments that is associated with both the first person and the interest; and
      identifying at least one valuable first person-interest moment from the plurality of first person-interest moments, wherein:
         each valuable first person-interest moment is associated with a subset of MCIs;
         each subset of MCIs of each valuable first person-interest moment comprises a total number of MCIs;
         the total number of MCIs for each valuable first person-interest moment comprises an interest number of MCIs associated with interest metadata indicative of the interest; and
         the interest number for each valuable first person-interest moment is greater than a threshold percentage of the total number of MCIs for each valuable first person-interest moment;
   each MCI of the collection of MCIs is associated with interest metadata indicative of the interest; and
   each MCI of the collection of MCIs is associated with a valuable first person-interest moment of the at least one valuable first person-interest moment.

5. The non-transitory machine readable medium of claim 4, wherein the threshold percentage is 60%.

6. The non-transitory machine readable medium of claim 5, wherein the threshold value is two.

7. The non-transitory machine readable medium of claim 1, wherein the interest is one of a pet, cooking, painting, an instrument, and a baby.

8. The non-transitory machine readable medium of claim 1, wherein the interest is a pet.

9. The non-transitory machine readable medium of claim 1, wherein the interest is a dog.

10. The non-transitory machine readable medium of claim 1, wherein the interest is a specific breed of dog.

11. The non-transitory machine readable medium of claim 1, wherein the residence of the first person comprises only a primary residence of the first person.

12. The non-transitory machine readable medium of claim 1, wherein the residence of the first person comprises each one of:
   any primary residence of the first person;
   any secondary residence of the first person; and
   any primary work location of the first person.

13. The non-transitory machine readable medium of claim 1, wherein the program further comprises additional sets of instructions for defining a composite presentation using at least some of the MCIs of the defined collection.

14. The non-transitory machine readable medium of claim 1, wherein:
   the analyzing further comprises:
      identifying a plurality of first person-interest moments from the plurality of moments, wherein each first person-interest moment of the plurality of first person-interest moments is a moment of the plurality of moments that is associated with both the first person and the interest; and
      identifying at least one valuable first person-interest moment from the plurality of first person-interest moments, wherein:
         each valuable first person-interest moment is associated with a subset of MCIs;
         each subset of MCIs of each valuable first person-interest moment comprises a total number of MCIs;

the total number of MCIs for each valuable first person-interest moment comprises an interest number of MCIs associated with interest metadata indicative of the interest; and the interest number for each valuable first person-interest moment is greater than a threshold percentage of the total number of MCIs for each valuable first person-interest moment;

each MCI of the collection of MCIs is associated with interest metadata indicative of the interest; and each MCI of the collection of MCIs is associated with at least one of:

a valuable first person-interest moment of the at least one valuable first person-interest moment; or a first person-residence moment of the first number of first person-residence moments.

15. The non-transitory machine readable medium of claim 14, wherein the threshold percentage is 60%.

16. The non-transitory machine readable medium of claim 14, wherein the threshold value is two.

17. A non-transitory machine readable medium storing a program for execution by at least one processing unit of a device, the program for managing a media library, the program comprising sets of instructions for:

accessing a plurality of media content items (MCIs) of the media library and metadata associated with the media library, wherein:

the metadata defines a plurality of moments;

each moment of the plurality of moments is associated with a subset of MCIs of the plurality of MCIs; and each MCI of the subset of MCIs that is associated with a particular moment is associated with:

geographical metadata indicative of a geographic location within a particular geographic range associated with the particular moment; and temporal metadata indicative of a time within a particular time range associated with the particular moment;

analyzing the plurality of MCIs and the metadata, wherein the analyzing comprises:

identifying a plurality of first person-residence moments from the plurality of moments, wherein each first person-residence moment of the plurality of first person-residence moments is a moment of the plurality of moments that is associated with both a first person and a residence of the first person; and identifying an interest that is associated with each one of a first number of first person-residence moments of the plurality of first person-residence moments, wherein the first number is greater than a threshold value; and defining a collection of MCIs of the plurality of MCIs, wherein:

each MCI of the collection of MCIs is associated with a moment of the plurality of moments that is associated with both the first person and the interest;

each MCI of the collection of MCIs is associated with interest metadata indicative of the interest; and each MCI of the collection is not associated with blacklist metadata indicative of any blacklisted feature for the interest.

18. The non-transitory machine readable medium of claim 17, wherein:

the interest is a pet; and a blacklisted feature of the interest is a baby.

19. A method of managing a media library with a computing system, the method comprising:

accessing, with the computing system, a plurality of media content items (MCIs) of the media library and metadata associated with the media library, wherein:

the metadata defines a plurality of moments;

each moment of the plurality of moments is associated with a subset of MCIs of the plurality of MCIs; and each MCI of the subset of MCIs that is associated with a particular moment is associated with temporal metadata indicative of a time within a particular time range associated with the particular moment;

analyzing, with the computing system, the plurality of MCIs and the metadata, wherein the analyzing comprises:

identifying a plurality of person-residence moments from the plurality of moments, wherein each person-residence moment of the plurality of person-residence moments is a moment of the plurality of moments that is associated with any location intimately associated with a person identity; and identifying an interest that is associated with at least two of the plurality of person-residence moments; and defining, with the computing system, a collection of MCIs of the plurality of MCIs, wherein each MCI of the collection of MCIs is associated with the identified interest.

20. A method of managing a media library with a computing system, the method comprising:

accessing, with the computing system, a plurality of media content items (MCIs) of the media library;

identifying, with the computing system, at least three MCIs of the plurality of MCIs that are associated with both a particular person entity and a particular interest; and defining, with the computing system, a collection of MCIs of the plurality of MCIs, wherein each MCI of the collection of MCIs is associated with the particular interest.

* * * * *